Figure 1:
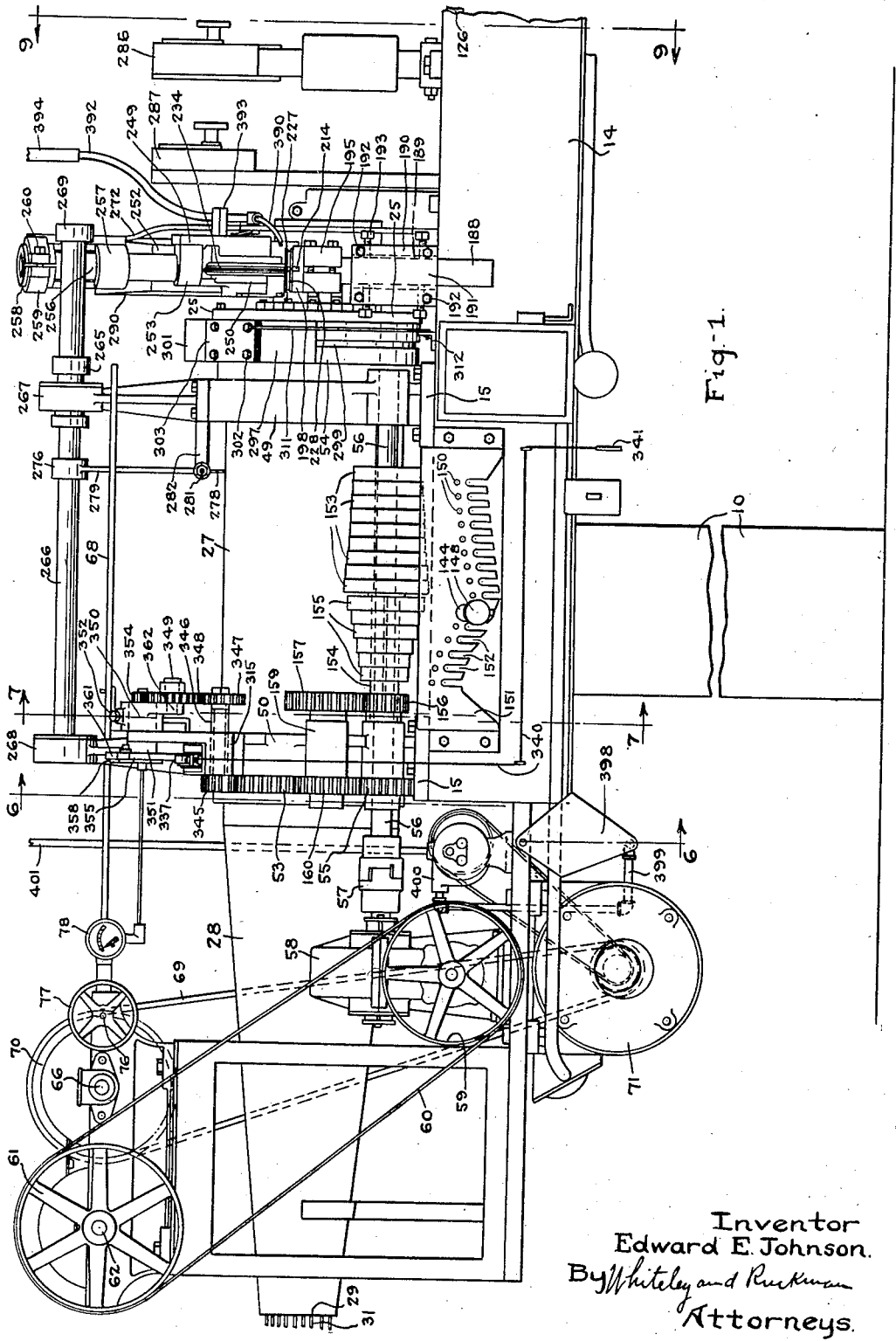

July 7, 1936.                E. E. JOHNSON                2,046,460
                  METALLICALLY INTEGRATED WELL SCREEN
              Original Filed March 19, 1932    17 Sheets-Sheet 1

Inventor
Edward E. Johnson.
By Whiteley and Ruckman
Attorneys.

July 7, 1936.  E. E. JOHNSON  2,046,460
METALLICALLY INTEGRATED WELL SCREEN
Original Filed March 19, 1932  17 Sheets-Sheet 2

Inventor:
Edward E. Johnson.
By Whiteley and Ruckman
Attorneys.

July 7, 1936.                E. E. JOHNSON                2,046,460
                  METALLICALLY INTEGRATED WELL SCREEN
                Original Filed March 19, 1932    17 Sheets-Sheet 4

Inventor:
Edward E. Johnson.
By Whiteley and Ruckman
Attorneys.

July 7, 1936.   E. E. JOHNSON   2,046,460
METALLICALLY INTEGRATED WELL SCREEN
Original Filed March 19, 1932   17 Sheets-Sheet 9

Inventor:
Edward E. Johnson
By Whiteley and Ruckman
Attorneys.

July 7, 1936.  E. E. JOHNSON  2,046,460
METALLICALLY INTEGRATED WELL SCREEN
Original Filed March 19, 1932   17 Sheets-Sheet 10

Inventor:
Edward E. Johnson
By Whiteley and Ruckman
Attorneys.

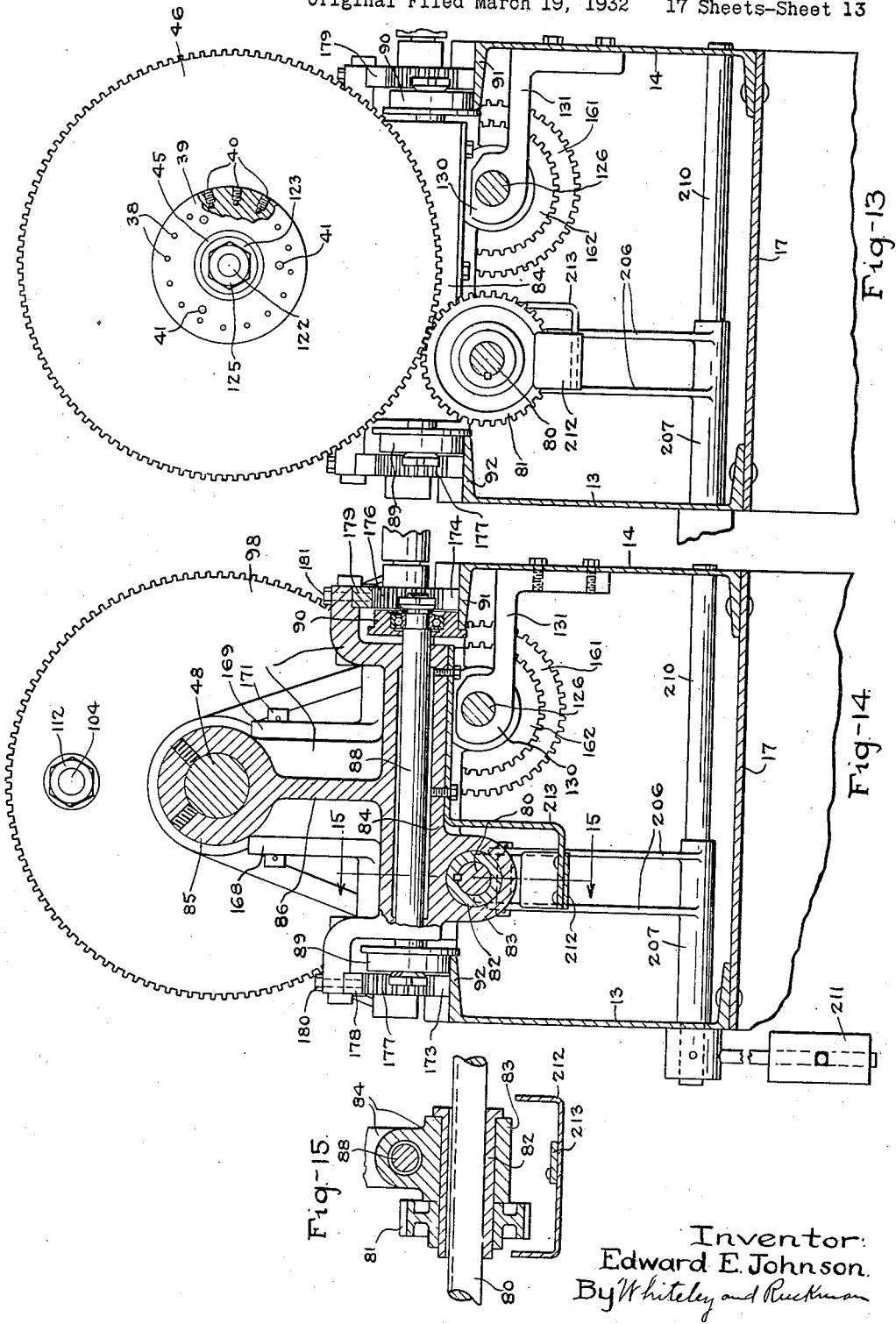

July 7, 1936.  E. E. JOHNSON  2,046,460
METALLICALLY INTEGRATED WELL SCREEN
Original Filed March 19, 1932  17 Sheets-Sheet 14
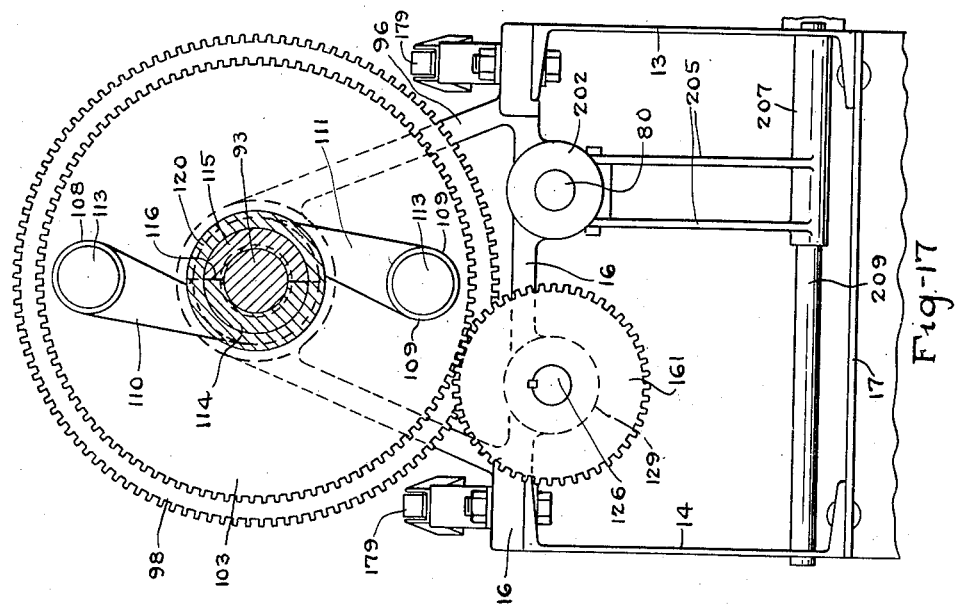
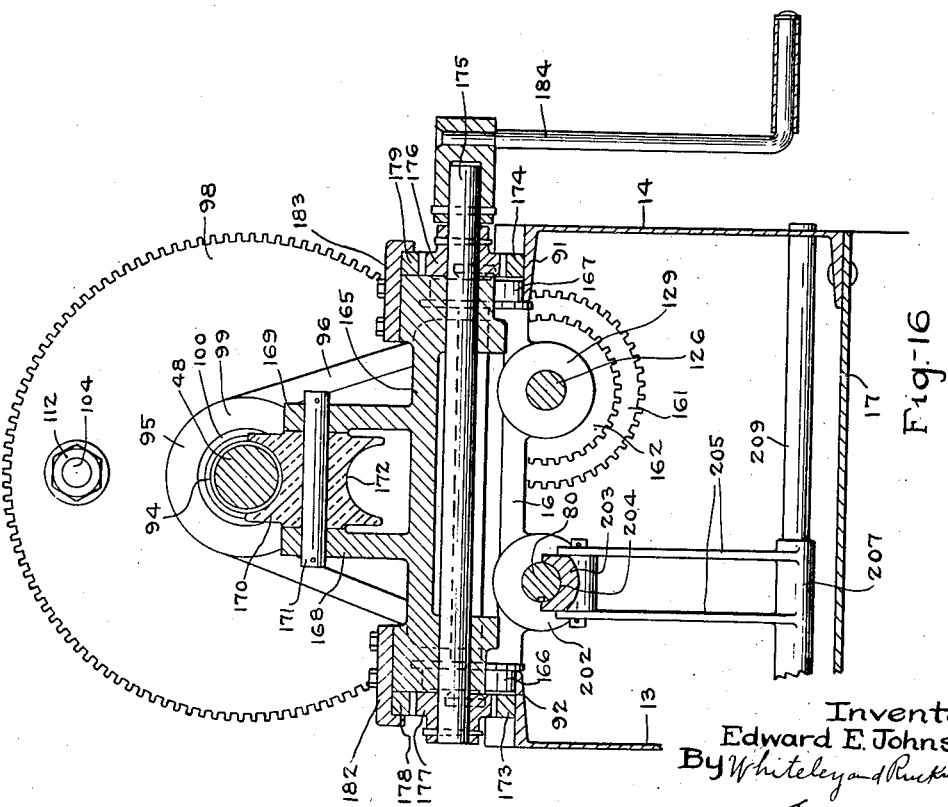
Inventor:
Edward E. Johnson.
By Whiteley and Ruckman
Attorneys.

July 7, 1936.   E. E. JOHNSON   2,046,460
METALLICALLY INTEGRATED WELL SCREEN
Original Filed March 19, 1932   17 Sheets-Sheet 15
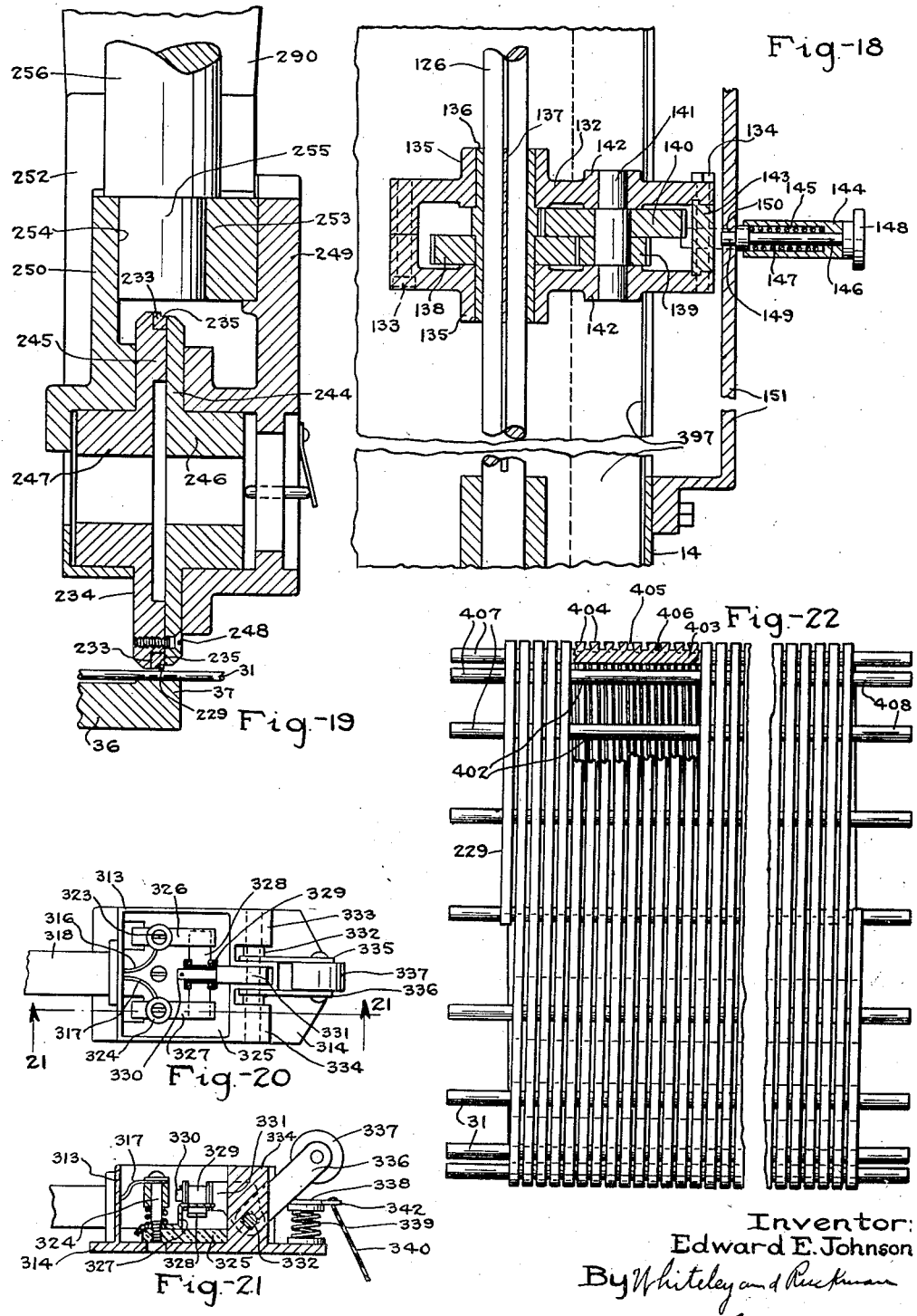
Inventor:
Edward E. Johnson
By Whiteley and Ruckman
Attorneys.

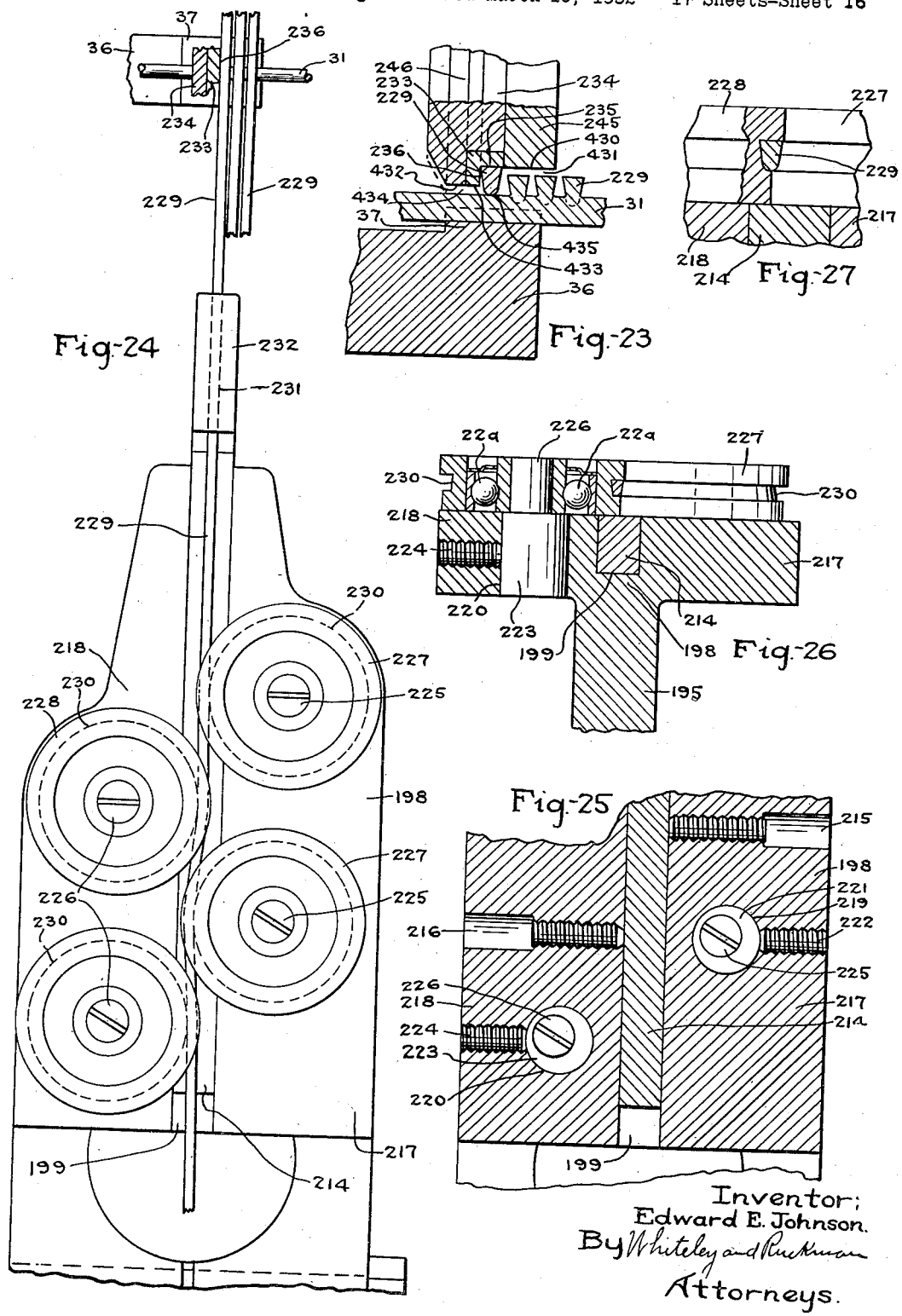

July 7, 1936.   E. E. JOHNSON   2,046,460
METALLICALLY INTEGRATED WELL SCREEN
Original Filed March 19, 1932   17 Sheets-Sheet 17
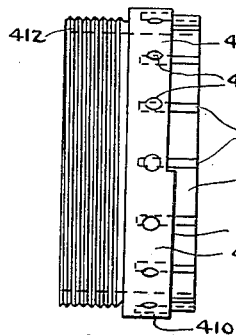
Fig.-29
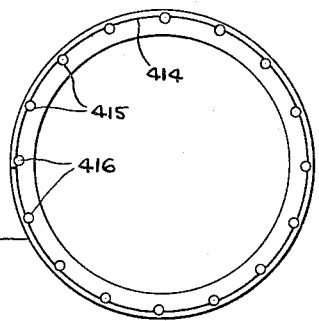
Fig.-28
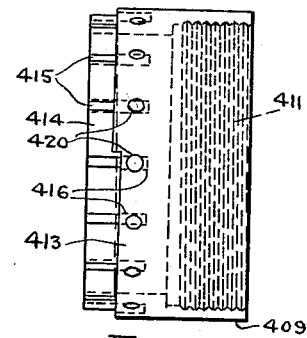
Fig.-30
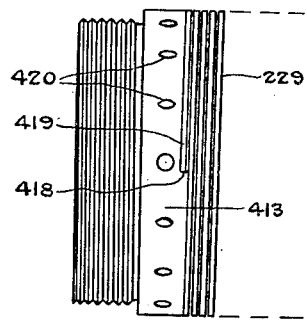
Fig.-31
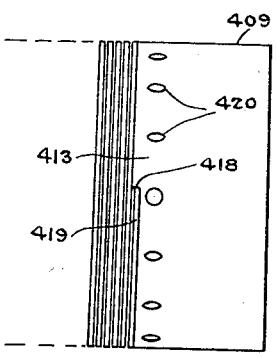
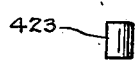
Fig.-34
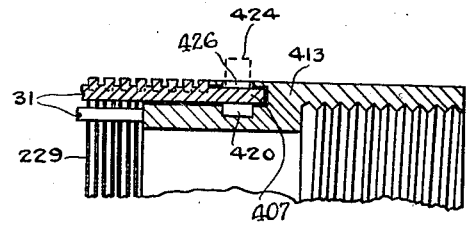
Fig.-32
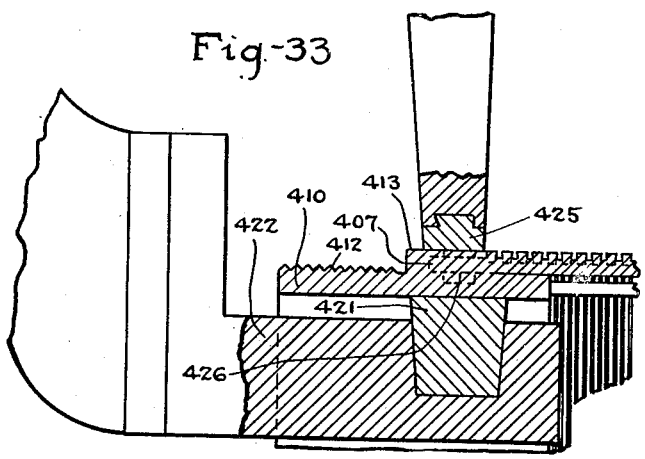
Fig.-33
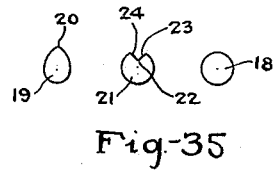
Fig.-35
Inventor:
Edward E. Johnson.
By Whiteley and
Ruckman
Attorneys.

Patented July 7, 1936

2,046,460

UNITED STATES PATENT OFFICE 2,046,460

METALLICALLY INTEGRATED WELL SCREEN

Edward E. Johnson, St. Paul, Minn., assignor to Edward E. Johnson, Incorporated, St. Paul, Minn.

Application March 19, 1932, Serial No. 599,970
Renewed December 4, 1935

37 Claims. (Cl. 219—4)

My invention relates to metallically-integrated well screens and the method and machine for making them. It is an object of my invention to provide a well screen of peculiarly strong, durable and efficient construction effected by laying a wire of suitable cross sectional shape helically upon a cylindrically-disposed group of longitudinally-extended rods also of suitable shape, and by integrally uniting the helically-disposed wire with the longitudinal rods at every crossing point thereof by welding, the coils of said wire having all their top or outer surfaces in common longitudinal planes parallel with the axis of the well screen, being closely spaced a suitable and predetermined distance, and being equally spaced throughout.

It is a further object of my invention to provide a process of making such well screens which consists in holding a group of wires or rods so that said rods will extend horizontally and will outline in one vertical plane a circular body, to hold an irregularly-shaped wire in said plane and so that a selected part of said wire will contact with at least one of said horizontal wires or rods, to simultaneously rotate and advance longitudinally the group of rods whereby the wire as so held will have the aforesaid selected portion caused to engage successively each rod to form a helix thereon with the coils of the helix equally spaced, to engage said wire with a contact member as it is held and caused to wind over the group of rods, to pass electric current through said contact member when it is over each of said rods for the purpose of welding and metallically integrating the wire and rods at each crossing point thereof, to dissipate some of the current away from the welding point after welding fusion has been accomplished, to merge the wire and rods together at each crossing point thereof a distance which will bring the outer extremities of the various helical coils into common longitudinal planes parallel with the axis of the well screen, to flood with water the contact surface and the rod and wire at points of contact to effect rapid cooling following each welding action, to move the surfaces of the contact member and of the rod in unison together while and immediately after the welding action takes place, and when a sufficient length of said wire has been wound upon and integrated with the body of rods to produce a screen of the desired length, to use the exposed ends of said rods as a means of metallically integrating end members upon and as a part of the finished screen, and effecting such metallic integration of the rods and end members.

It is a further object of my invention to provide a machine having coordinated instrumentalities for carrying out the steps of my process and for producing the aforesaid metallically-integrated well screen of any desired diameter and length, and to do so rapidly, efficiently and economically.

It is a further object of my invention to provide in such a machine a rotating hollow spindle or drum and a head thereon having guides for a group of longitudinally-extended rods, which guides and the rods held thereby will outline a circle, and which head is removably secured so that other heads adapted for screens of various diameters may be employed; in combination with a second head, similarly removable and being adapted for screens of corresponding various diameters, said second head adapted to receive and hold the ends of the rods, together with means for rotating the two heads simultaneously at the same and suitable speeds, and with means for varying the rate of rotation of said heads.

It is a further object of my said invention to provide in said machine means for holding a wire in a transverse vertical plane extending through a portion of said rod-guiding means which constitutes the welding plane, and for guiding and positioning said wire in such manner that as said heads are rotated the wire will be caused to engage successively with the several rods of said group of rods, and to provide means for advancing the second above-named head longitudinally of the machine while both heads are being rotated, thereby separating the heads as they rotate and causing said wire to be wound upon the rods in the form of a helix, together with means for causing the rate of advance of said second-named head to be varied whereby the coils of said helix will be caused to be spaced apart varying distances to effect a coarse or fine strainer-slot arrangement as desired.

A further object of my invention is to provide in said machine effective means for integrally uniting, by an electric welding operation, said wire with said longitudinal rods at each crossing point of the wire over the rods as the group of rods is rotated and the wire is wound thereon. This means consists of a contact member pressed down with a material degree of force (by springs, gravity or other desired means) upon the wire as the same is wound, with means for passing an electric current through said contact member and the wire and rod, synchronized to be operative at the periods of each crossing of the wire over each of said rods, together with means for causing the contacting surface of the contact member to move forward along with the wire and rod while the electric current is on and welding is taking place, and also with means for flooding each rod and the wire with water to effect quick cooling thereof.

It is a further object of my invention to provide means for fixing the number of operations of the current-passing devices, per revolution of the hollow spindle and guide head, to accord with the number of rods in the particular diameter of well screen being fabricated and adjusting the same to different diameters of well screen so that the sequence of each passing of current and welding operation shall be that required for any diameter of well screen.

It is a further object of my invention to provide, in conjunction with the ends of the group of rods which project beyond the walls of the screen formed by the helically-wound wire metallically-integrated with the rods, finishing end members, each of which will be integrally united with one set of said rod-ends.

Other objects and advantages of my invention will appear in the detailed description thereof hereinafter given, and the various novel features of my invention are particularly pointed out in the appended claims.

It will be noted that the process herein described and some features of the machine herein described and claimed, constitute and are in some particulars a continuation of my copending application Serial No. 467,527, filed July 12, 1930.

Figure 2:
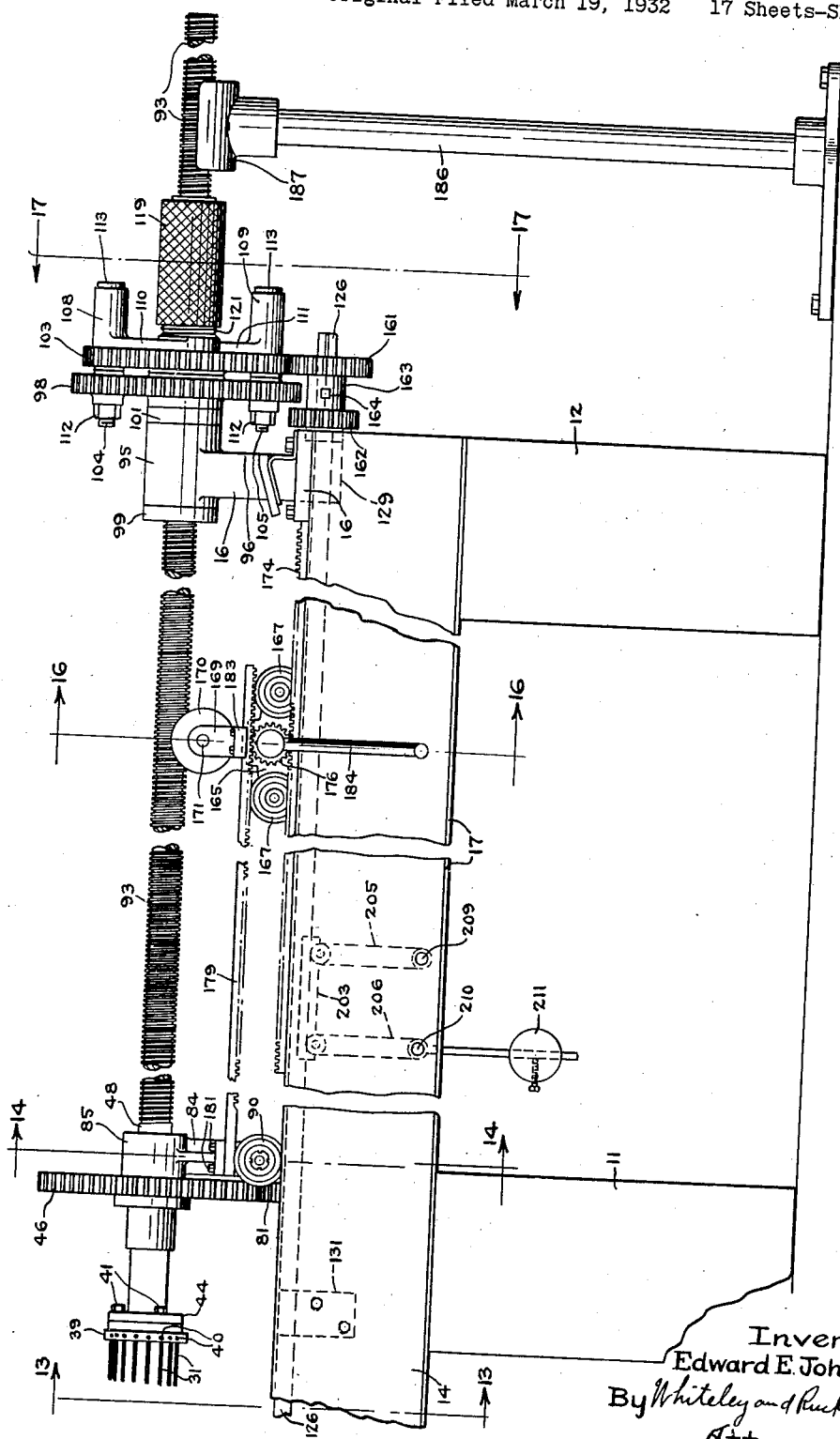
Figure 3:
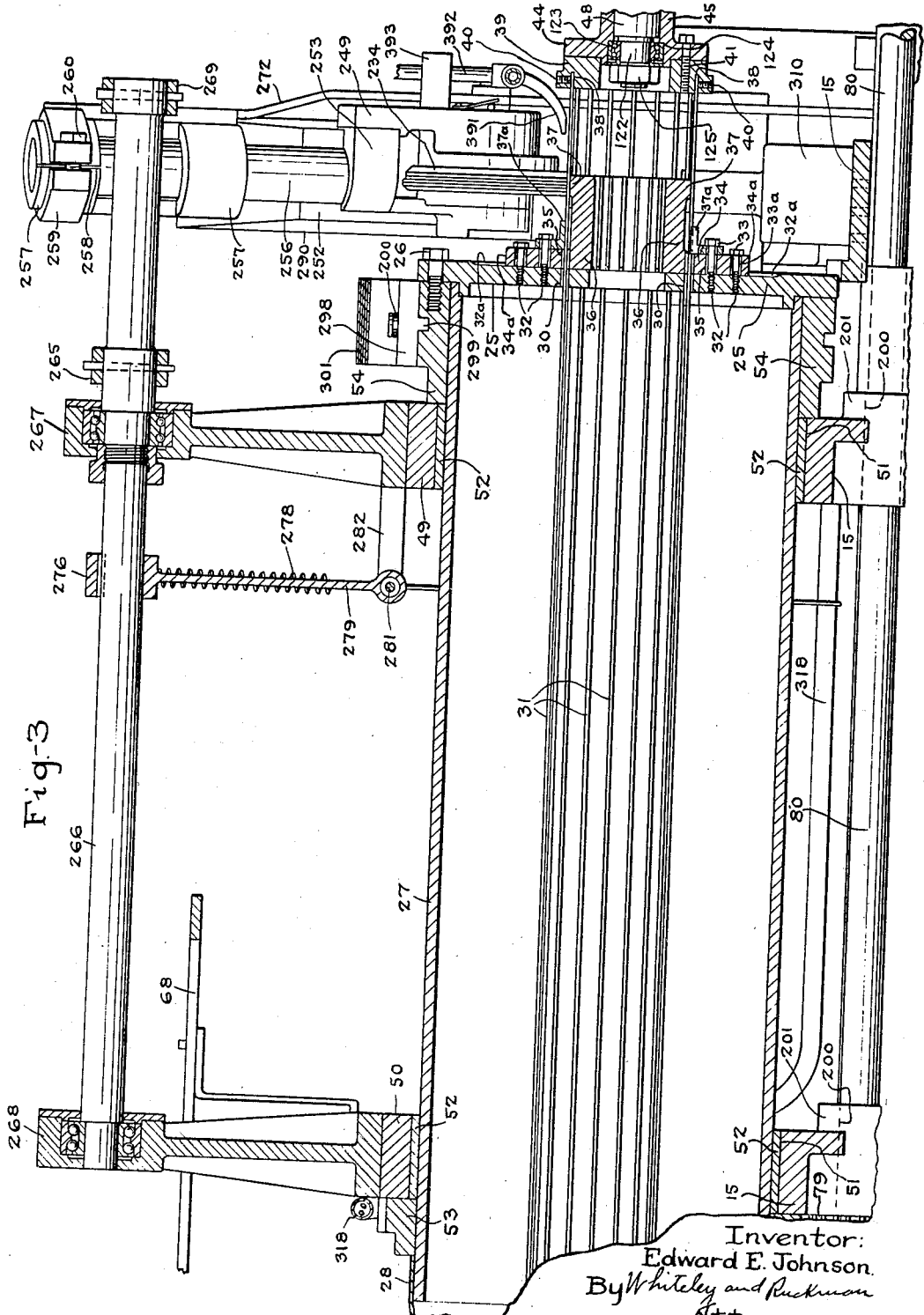
Figure 4:
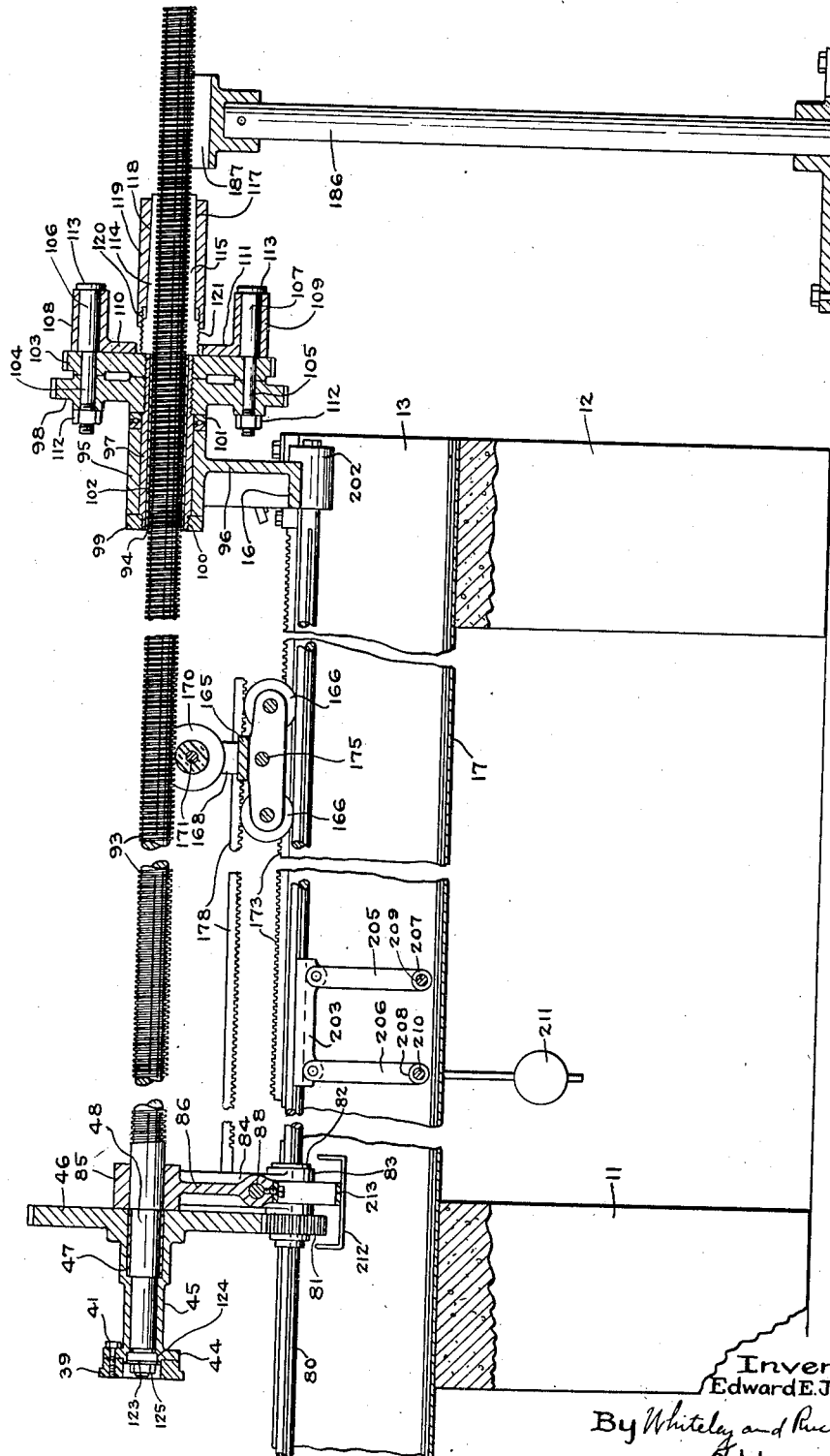
Figure 5:
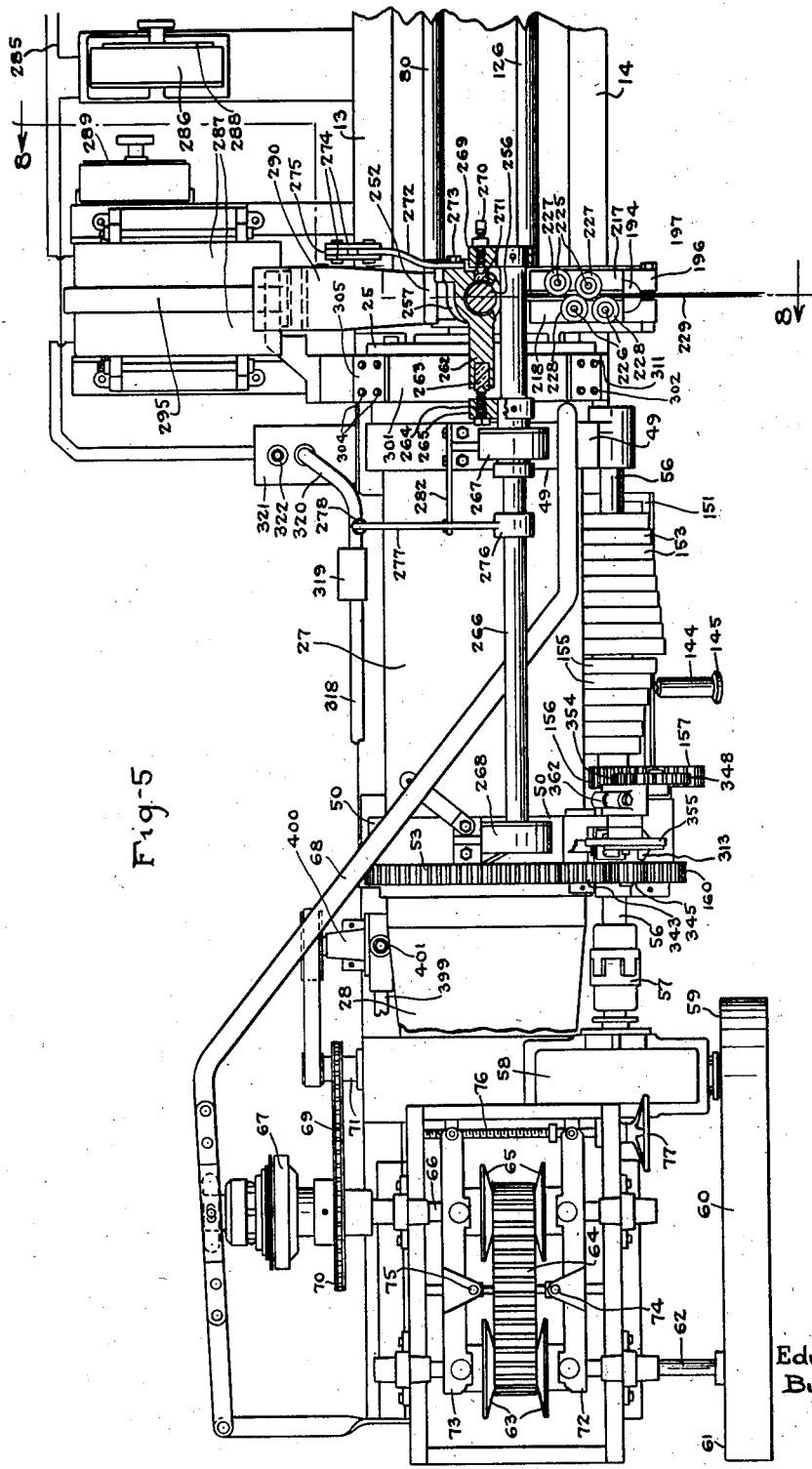
Figure 6:
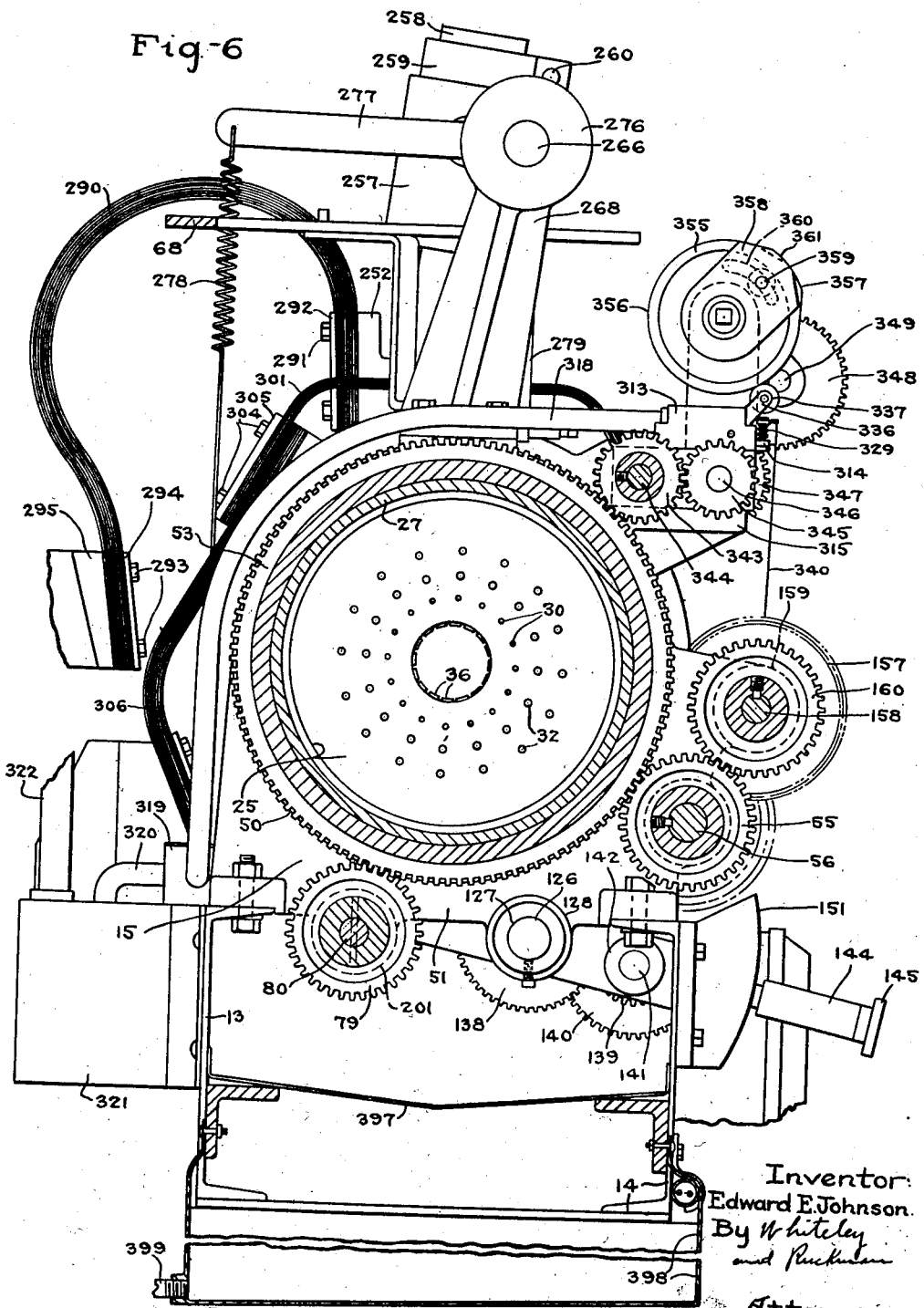
Figure 7:
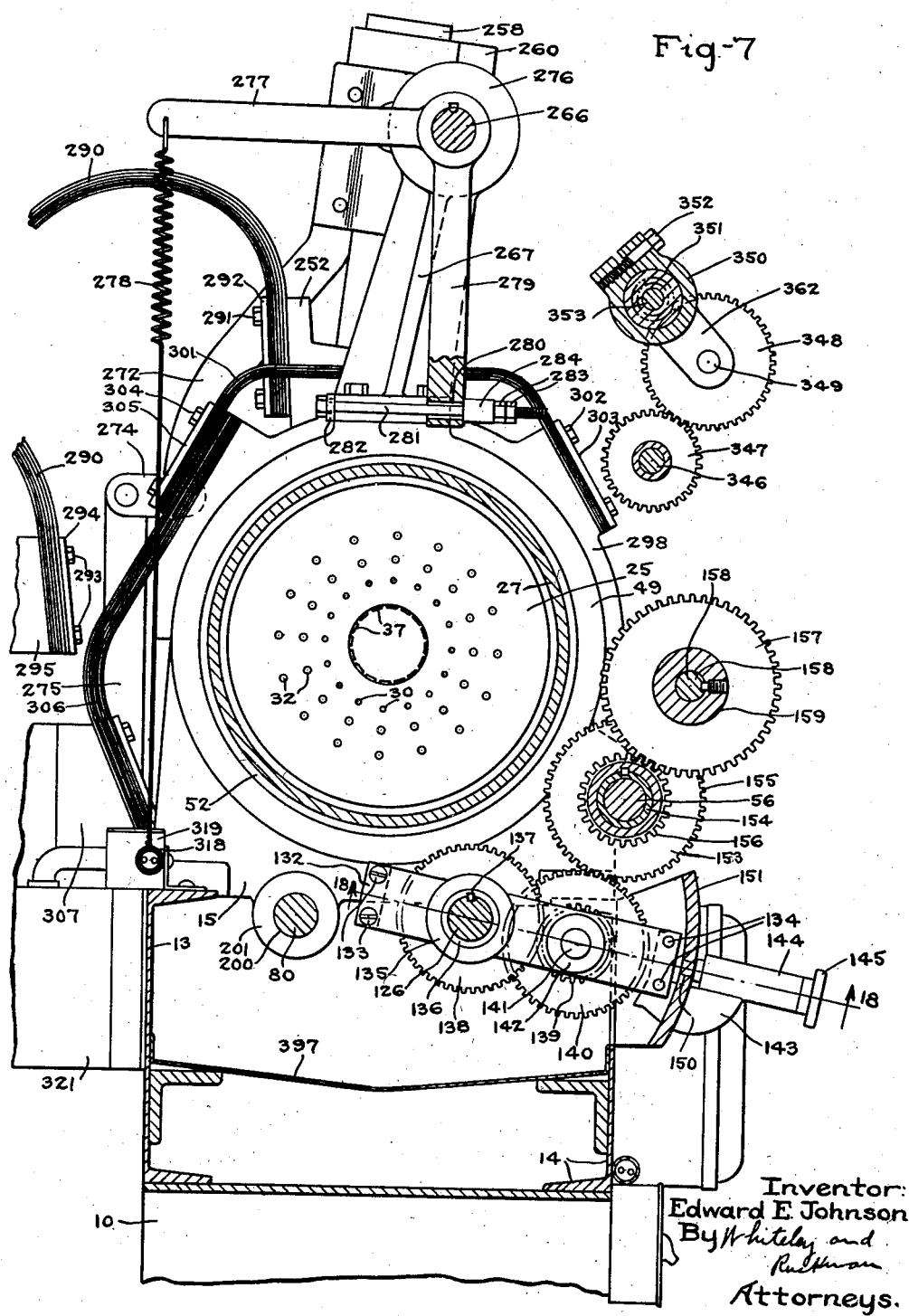
Figure 8:
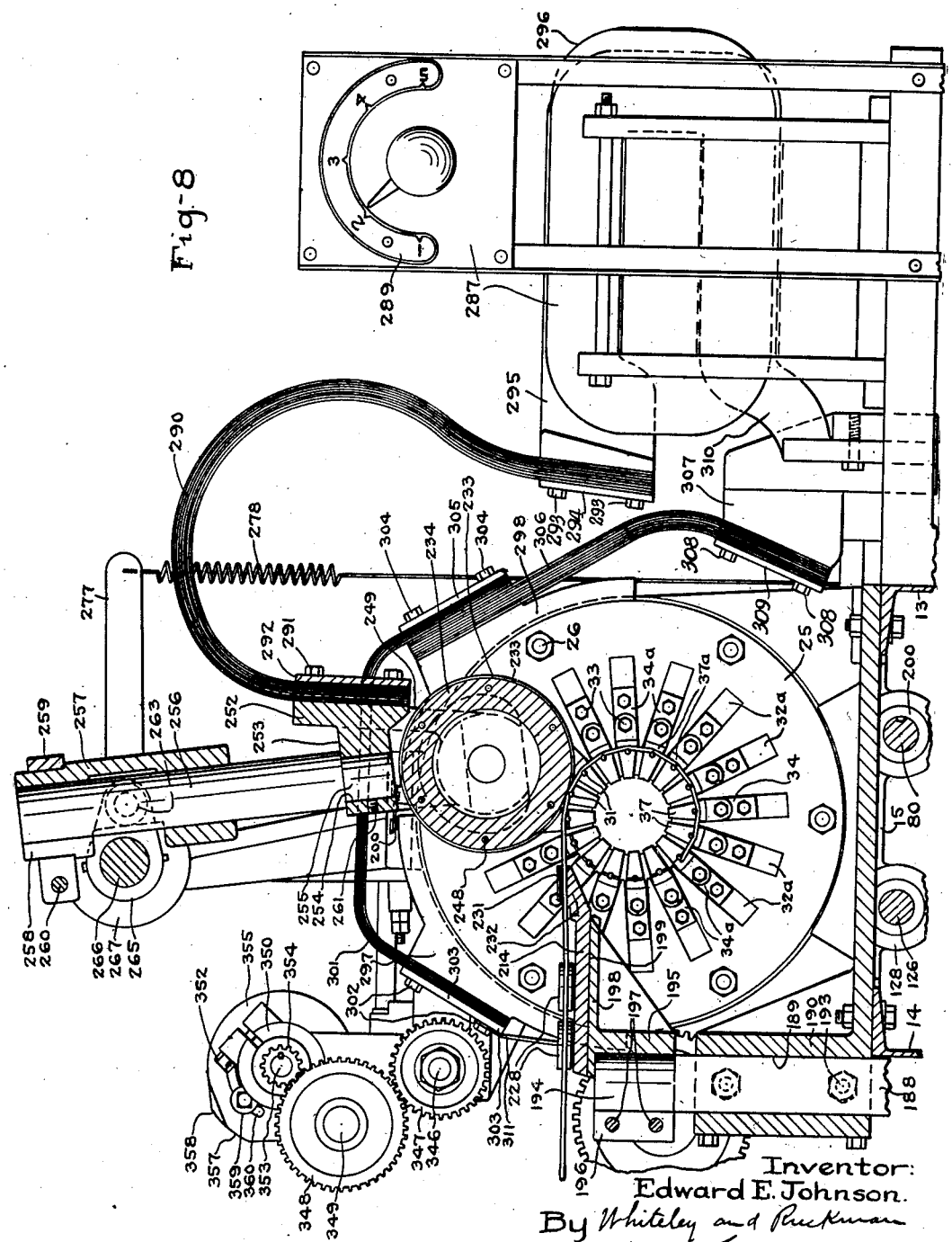
Figure 9:
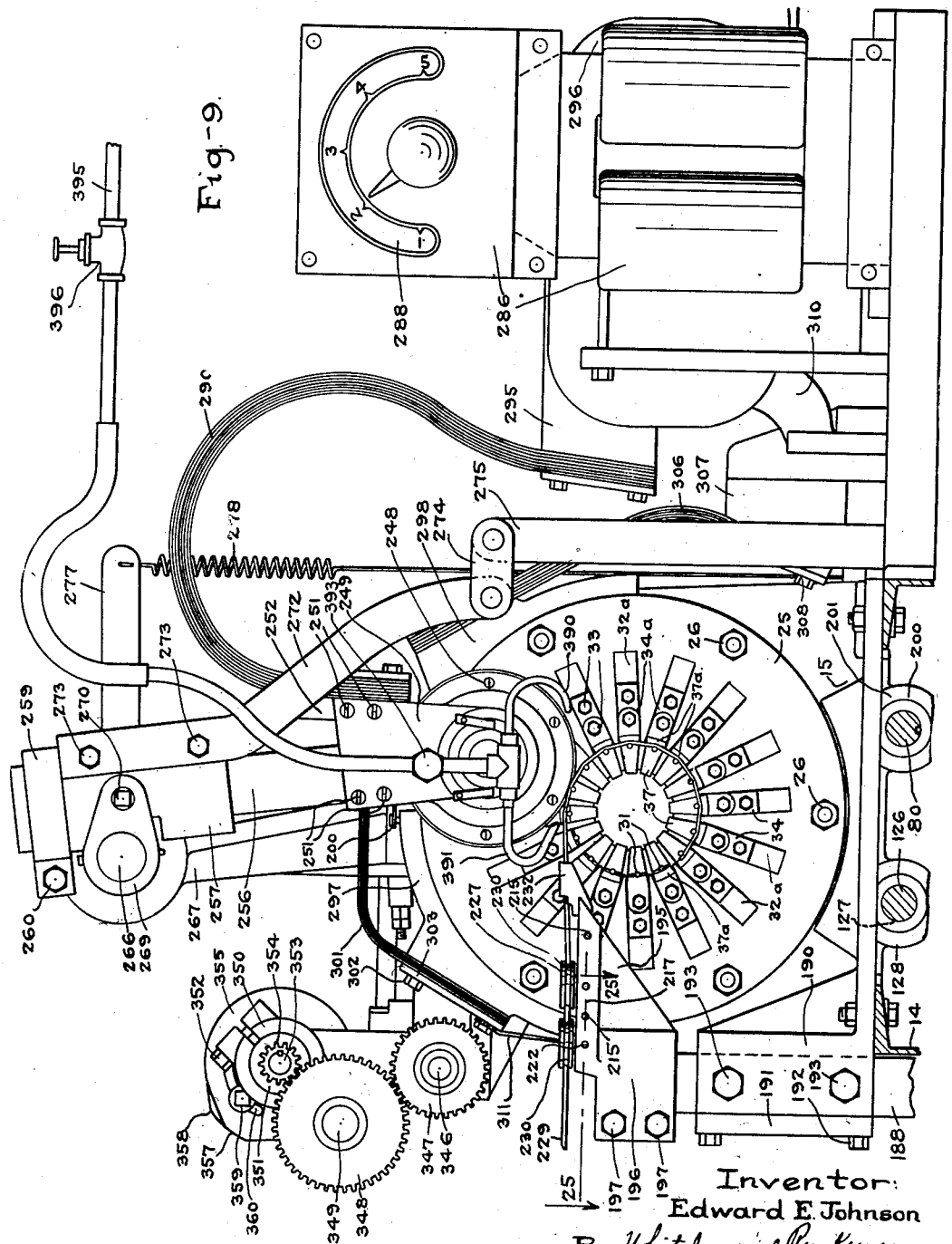
Figure 10:
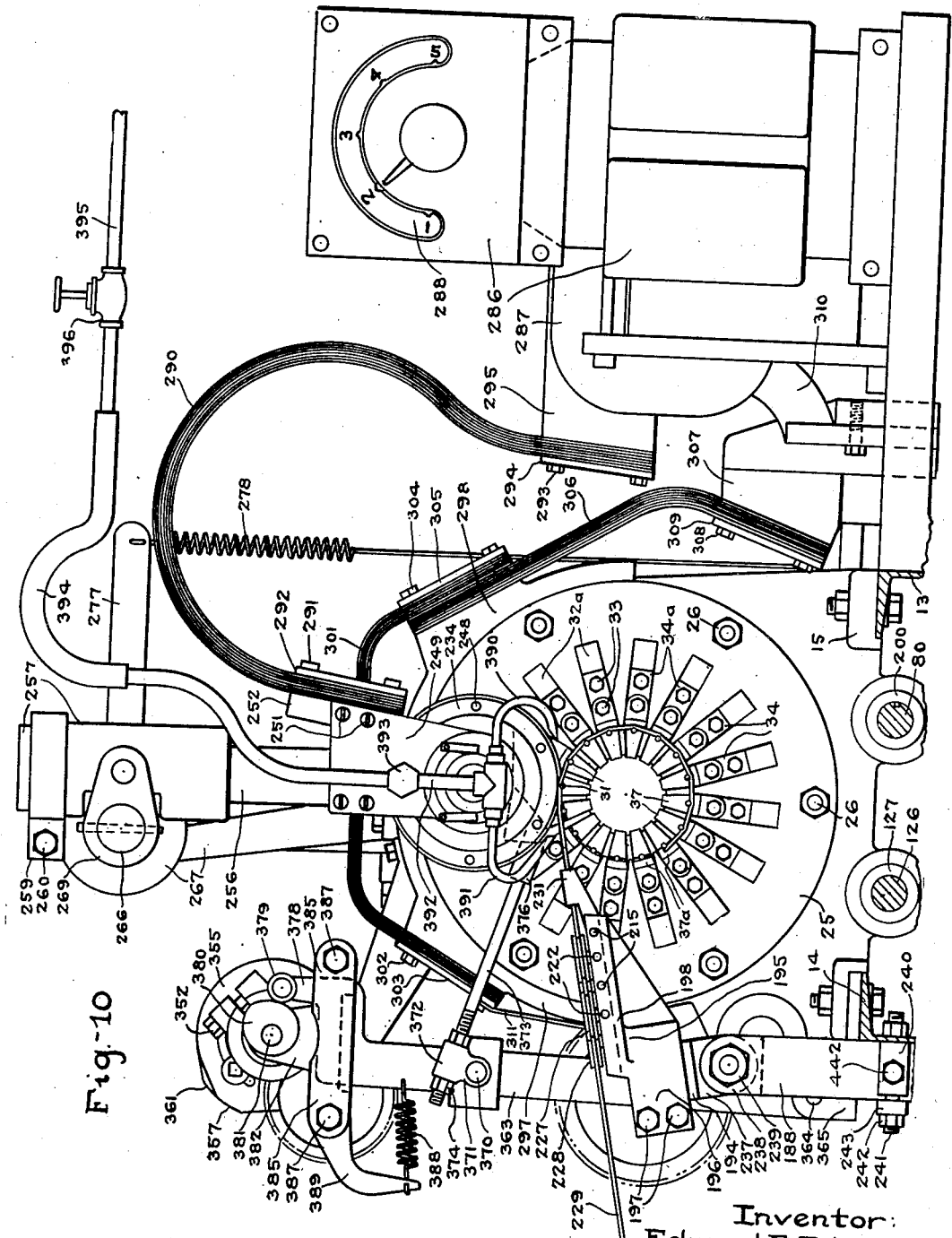
Figure 11:
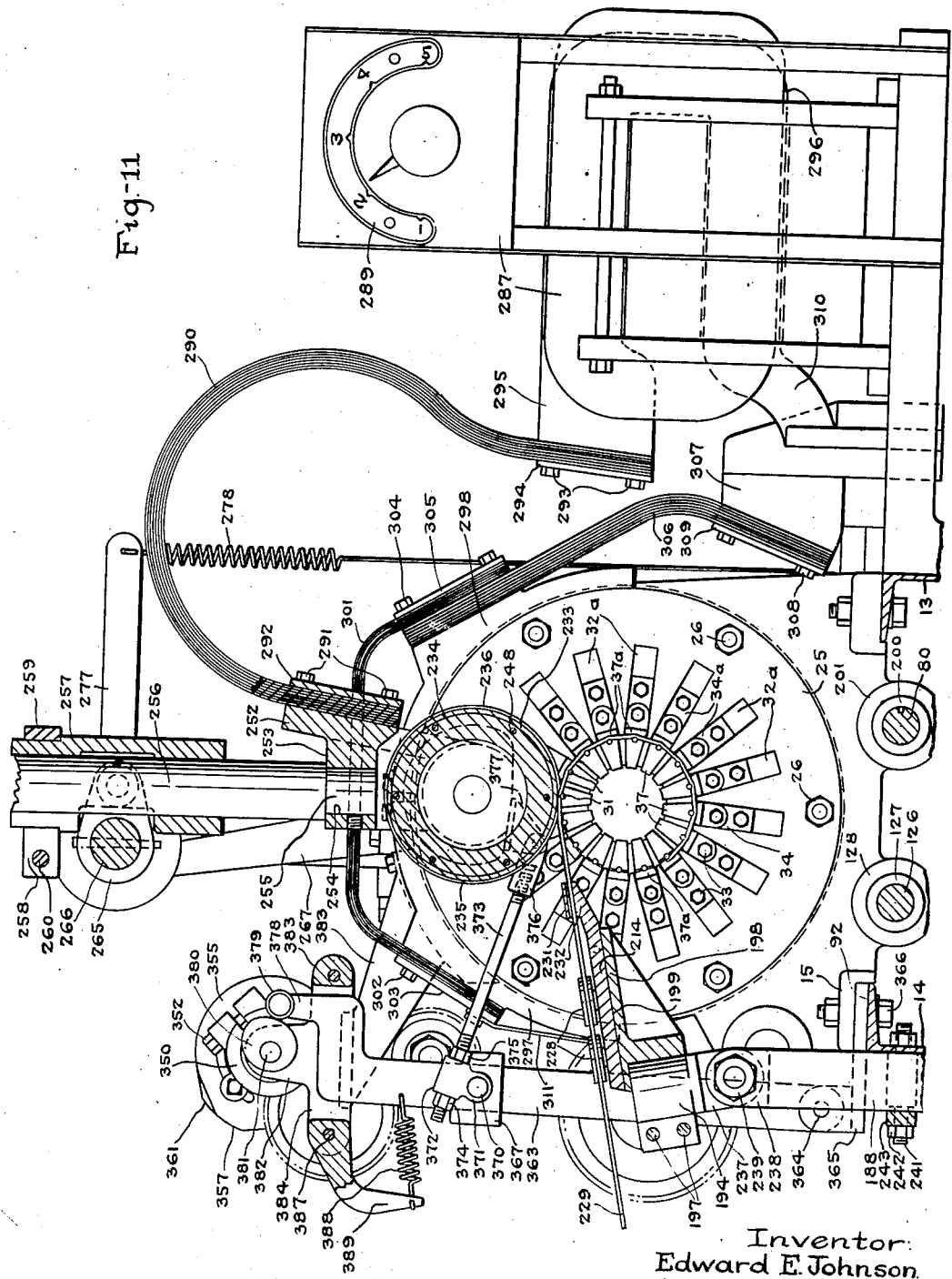
Figure 12:
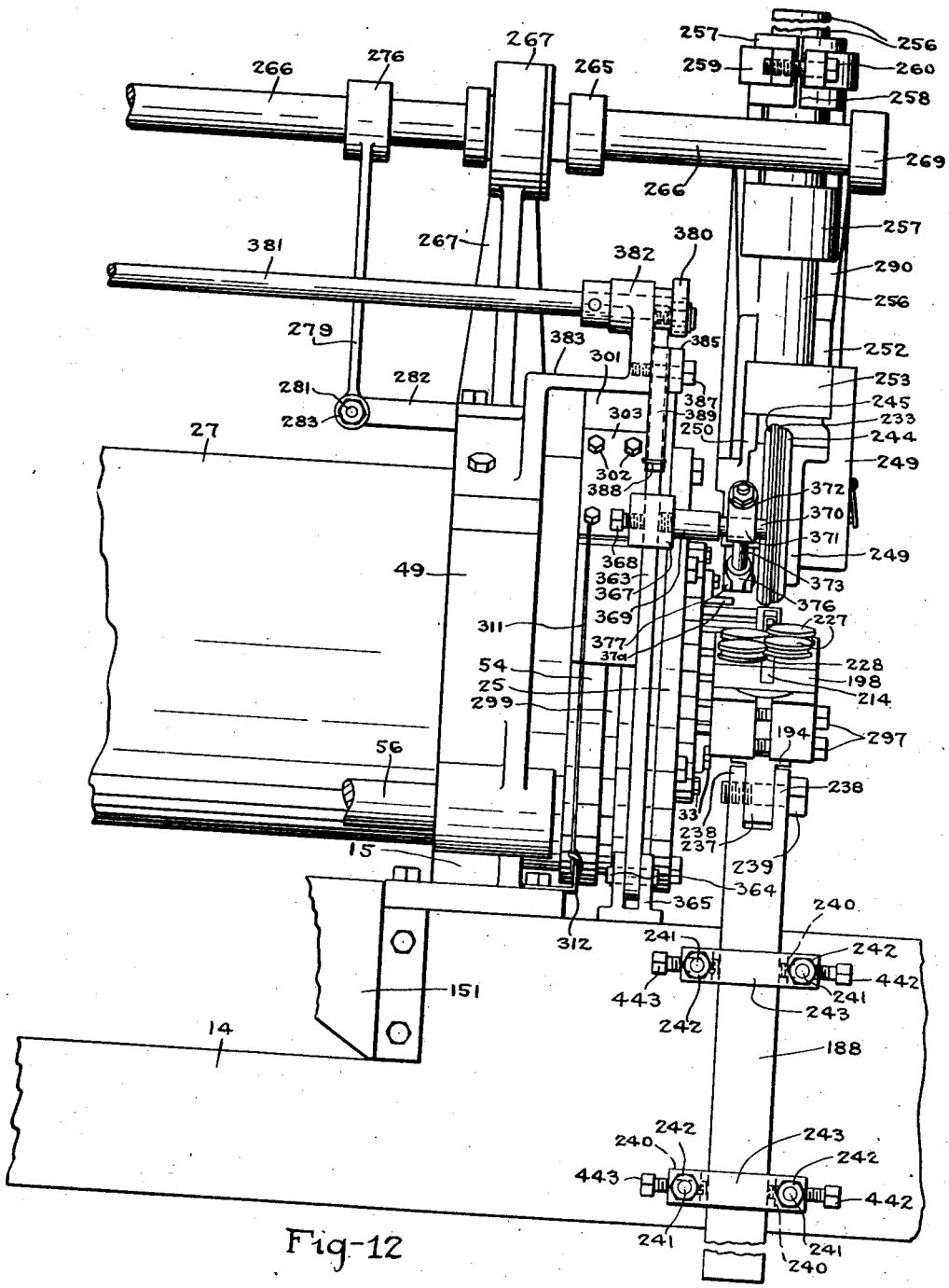

In drawings, illustrating one form of apparatus for carrying out, effecting and embodying my invention, Fig. 1 is a longitudinal side elevation of the front part of a machine adapted to carry out my process and produce my metallically-integrated well screen. Fig. 2 is a side elevation of parts of said machine not shown in Fig. 1. Fig. 3 is a part sectional side elevation of parts of the front end of the machine. Fig. 4 is a sectional side elevation of the rear end of the machine. Fig. 5 is a top plan view of the front end of said machine with some parts in section. Fig. 6 is a sectional end elevation of the machine taken on line 6—6 of Fig. 1 viewed in the direction of the arrows and with some alternative parts omitted. Fig. 7 is a sectional end elevation of the machine taken on line 7—7 of Fig. 1 viewed in the direction of the arrows and with some alternative parts omitted. Fig. 8 is a sectional end elevational view of the machine taken on line 8—8 of Fig. 5. Fig. 9 is an end elevational view of the upper part of the machine taken on line 9—9 of Fig. 1 viewed in the direction of the arrows. Fig. 10 is a view similar to Fig. 9 showing an arrangement of adjustable wire holder and contact member controller not shown in Fig. 9. Fig. 11 is a sectional elevational view similar to Fig. 10 but taken in part on a vertical section passing through the line of feed-in of the winding wire. Fig. 12 is a side elevation of the parts shown in Fig. 11. Fig. 13 is a sectional elevational view on an enlarged scale on line 13—13 of Fig. 2 viewed in the direction of the arrows. Fig. 14 is a sectional elevational view on an enlarged scale taken on line 14—14 of Fig. 2 of the drawings. Fig. 15 is a transverse fragmentary sectional view on line 15—15 of Fig. 14 viewed in the direction of the arrows. Fig. 16 is a sectional elevational view on an enlarged scale on line 16—16 of Fig. 2 viewed in the direction of the arrows. Fig. 17 is a sectional elevational view on an enlarged scale taken on line 17—17 of Fig. 2 viewed in the direction of the arrows. Fig. 18 is a horizontal sectional detail view of the gear shifter mechanism shown in Figs. 5 and 7 taken on line 18—18 of Fig. 7. Fig. 19 is a longitudinal sectional detail view taken across the contact roller and in the plane of the longitudinal rod in welding position. Fig. 20 is a detail plan view of the circuit breaker mechanism, and Fig. 21 is a sectional elevational view of the same taken on line 21—21 of Fig. 20 viewed in the direction of the arrows. Fig. 22 is a fragmentary part sectional view of a portion of a well screen made in accordance with and by practicing the principles of my said invention. Fig. 23 is a much enlarged sectional detail view of part of welding ring and rod holding mechanism to show features of the wire holding and welding operation. Fig. 24 is an enlarged plan view of wire-holding tension and guide rollers with a part in section. Fig. 25 is an enlarged sectional plan view taken on line 25—25 of Fig. 9. Fig. 26 is an enlarged sectional detail elevational view through the tensioning and guide rollers for the wire and through the supports for the same, showing the characteristics of the guide grooves in relation to the wire. Fig. 27 is a similar fragmentary view showing wire having a different cross-sectional shape and guide rollers therefor. Fig. 28 is an end view of male and female members for finishing the end of the screen. Fig. 29 is a side view of the male end member and Fig. 30 is the side view of the female end member. Fig. 31 is a side view in part fragmentary of a screen embodying the male and female finished members. Fig. 32 and Fig. 33 are longitudinal sectional views illustrating the manner of securing the cage or rods to the respective end members. Fig. 34 illustrates the welding plug employed for that purpose. Fig. 35 is a cross sectional view of longitudinal wires which may be employed showing some differing shapes of wire adapted to be employed in my process and machine.

The steps of the process by which my improved well screen is produced have been pointed out broadly and in some detail in the statement of invention and are broadly pointed out in some of the appended claims. I will now describe a form of machine for carrying out the steps of said process, as illustrated in the drawings. Upon suitable supports 10, 11, 12, Fig. 1 and Fig. 2, which may be composed of concrete, steel or any other suitable material, a bed is formed comprising two longitudinal main beams 13, 14, which are held in fixed parallel and spaced relation by head stock frame members (which may be a casting) 15, tail stock frame member 16 and a bottom transverse tie plate 17 as shown in Figs. 13, 14, 16 and 17. The purpose of this supporting structure is to form a rigid immovable bed of sufficient strength to support the operating instrumentalities at the head and rear thereof and to provide intermediate supporting means for said instrumentalities, said bed being of a length such as to permit the manufacture of the longest desirable well screens, which means that the front and rear instrumentalities must be separated a distance somewhat greater than the maximum length of well screens which it is proposed to make on the machine.

The rod holding and guiding and supporting mechanism

The longitudinal members of the well screen are, for purposes of differentiation, referred to herein as rods, although these members are in effect wires in much the same sense and having about the same cross-sectional area as the so-called wire which is to be helically wound upon the cylinder of rods, and in practice the wire and rods will be of the same metal or alloy, although it is within the scope of my invention to have them of different metals or alloys. The rods are or may be of varying cross sectional shapes as shown in Fig. 35, being round as indicated at 18 or ovate as indicated at 19, with a somewhat pointed end 20, or having a normally round body 21 a longitudinal slot as indicated at 22 with a pair of prong-like extensions 23 and 24, or of other cross-sectional shapes, as found practically desirable.

In the practice of my process and the fabrication of the well screen, the rods so-called will be held in fixed spaced and parallel relation at and beyond the vertical welding plane in such manner that the group of rods in the welding plane will outline a circle with their outer margins. The means for holding the rods comprise, first, a head 25, clearly shown in Fig. 3, which is removably secured by means of bolts 26 to a hollow spindle or cylinder 27 which is continued toward the front of the machine in an elongated funnel 28 for holding and guiding the entire group of rods through the machine, as indicated at 29. The head plate 25 is made removable so that it may be interchanged with other heads all adapted to be bolted to the end of the same hollow spindle but having a circle of guide holes indicated at 30 in Figs. 3 and 7 which, in each particular head, outline a circle of a different diameter from that of any other heads. As, for example, heads may be provided with holes outlining circles running from four inches in diameter for the smallest circle up to, say, fourteen inches in diameter for the largest circle. Or, with a larger hollow spindle, the heads may have holes outlining circles of from twelve to twenty-four inches in diameter for larger screens. But I do not limit myself to any maximum or minimum diameters, since it is within the scope of my invention to make, in accordance with my process herein set forth and the machine for carrying it into effect, well screens of any desired diameter. But regardless of the diameter or length of the screen to be made, the several rods 31 forming longitudinal ribs of the completed screen are, for reasons which will hereinafter appear, held spaced the same distance apart in each particular diameter of well screen; and the number of rods in any particular diameter size of well screen will ordinarily vary directly as the several diameters vary.

Each of the head plates 25 is provided with a multiplicity of pairs of threaded apertures 32 radially alined with the guide apertures 30 on said plates. On the faces of the head plates 25, as shown in Fig. 8, are a corresponding number of radially-extended slot-like depressions 32a, the holes 32 being disposed along the center lines of these depressions. Each of the slots 32a is adapted to receive a base portion 34a of an L-shaped guide and welding anvil 34, shown in plan in Figs. 8 and 9, and in transverse section in Fig. 3, and is adjustably secured upon the head plates 25 by means of bolts 33 threaded into said apertures 32. As clearly shown in Fig. 3, the bolts 33 extend through elongated apertures 33a in said base portions 34a, which permits the requisite radial adjustment of the anvil pieces 34. As clearly shown in Fig. 3, and also in details of larger dimension in Figs. 19, 22 and 24, the several L-shaped pieces 34 comprise in addition to the base member 34a a horizontal extension 36 formed with a raised anvil or contact portion 37, the surface of which is formed with an open top groove in horizontal alinement with an aperture 35 formed in the base portion 34a. The radial adjustment heretofore mentioned permits the positioning of this member so that the groove and the aperture 35 with which it communicates may be brought into proper position relative to the aperture 30. The anvil guide pieces 34 equal in number the number of horizontal wires or rods employed for any particular sized screen. And the adjustment above mentioned also makes possible the positioning of the several grooves in contact portions 37 of all of the anvil pieces 34 in accurate circular alinement about the axis of the spindle 27, so that the rods 31 will present a similar character of circular alinement, the apertures 30 and 35 being clearance apertures so as to permit such adjustment. The welding guide pieces are similar for all of the different sized head plates 25, but will be differently positioned with reference to the axis thereof, and more or less numerous according to the diameter of screen for which the particular head plate 25 is designed.

The rods 31 may be circular in cross-section and hence, since all their transverse sections are identical, may be drawn across the anvils 34 in any position. But rods of irregular cross-section may be used, such as those shown in Fig. 35, and such rods must be drawn across the anvils 34 with their cross-sections maintained in fixed radial positions. To accomplish this I provide top guide members 37a, which, in any case, will have a guide groove formed along their bottom wall adapted to receive and hold a selected portion of the deformed or irregular rod used in fabricating the well screen, and which top guide members are adjustably held in position by means of bolt 33 passing through a clearance hole on the base portion of said guide members. It will be understood that the top guide members 37a will be varied in character to be adapted to the particular cross-sectional rod shape which is being employed.

The anvils 34 are of ample cross-section at all points to provide electrical current-carrying capacity without heating. It is important also that the contact surfaces between plate 25 and anvil 34 be capable of carrying the electrical current without appreciable loss, since all current must pass through plate 25 and to connections hereinafter to be described. Therefore, I prefer to make the anvil guides L-shaped, as shown, with their base portions 34a fitted radially into the grooves 32a of considerable area. In all cases the welding anvils 34 form at their grooved portions 37 a guide and support for the rods 31 in and across the vertical welding plane, all as shown in Figs. 3 and 13. The head-plate 39 is removably held by means of screws 41 to a flange 44 fast on a tubular spindle 45, preferably cast integral with a spur gear 46, as best shown in Fig. 4. The tail spindle 45 carrying flange 44 and gear 46 is mounted to rotate on a sleeve or bearing 47 on a shaft 48, the manner of mounting and function of which will be hereinafter described.

The removable head-plates 39 will, in each case, have the same number of rod-receiving apertures similarly positioned as those of the head plates 25, the number of apertures and the diameters of the circles outlined thereby being, of course, determined by the diameters of well screen which it is proposed to make. The apertures 38 in the head plates 39 are in longitudinal alinement with the apertures 30 in the head plates 25 and apertures 35 in the welding guide-pieces 34. The open-topped grooves or concaved depressions in the anvil-portions 37 for receiving the bottoms of the rods are clearly indicated in Figs. 8 and 9, and these depressions have their lower walls in alignment with the corresponding walls of apertures 30 and 35 in head plate 25 and with the walls of apertures 38 in head plate 39. The rods 31 are thus held and guided between the said head plates so as to engage in fixed longitudinal planes the grooved receiving surfaces of the welding anvil portions 37.

The rods 31 are of relatively small diameter (in practice about one-eighth of an inch) as compared with their length, which may be anywhere up to twenty feet, and while their front ends are secured in plate 39 and are guided in head plate 25 it is necessary that their rearwardly extending lengths be supported in a fairly compact bundle while they rotate and are drawn forward as the screen is being fabricated so as to keep them free from becoming twisted and tangled. This result is secured by forming the hollow spindle 27 through which they are fed forward, with a conical tubular rear extension 28 through which they pass freely to an extended tubular support not shown.

*Means for rotating the rod-holding devices*

Since the head plate 25 and the rod-end holding plate 39 must be separated as the well screen is made, in a manner hereinafter described, there can be no direct operative connection between these two holding members. Yet means must be, and are, provided for rotating them at the same speed. The drum or hollow spindle 27 is held in constantly stable horizontal axis in bearings formed by castings 49 and 50, which are integral with the respective transverse castings 15, as best shown in Fig. 3. These bearings comprise in each case a circular inner face 51 and a bushing ring 52 of brass or other suitable bushing material therein. A ring gear 53 is fast on the hollow spindle 27 to take outside of the ring casting 51 and bushing 52, and a brass contact member 54 is fast on the other end of the hollow spindle 27 so as to take on the other side of the ring casting 51 and bushing 52, the head plate 25 being secured to the contact ring 54. In this manner the hollow spindle 27 is held in position for rotation about a horizontal axis in the bearings formed in the separated ring castings 51 and in such manner that possibility of movement either longitudinally or transversely is entirely eliminated.

The rig gear 53 meshes with a spur gear 55 fast on a shaft 56 which is connected by a jaw coupling 57 with reduction gearing in box 58. The gearing in the gear box 58 is driven by a pulley 59 having driving connection through belt 60 with a pulley 61 on a shaft 62 which carries double discs 63 of a friction change speed mechanism. Running over the discs 63 is an endless friction member 64 of well-known construction which runs over similar friction discs 65 on a shaft 66. Through a clutch 67 operated by hand lever 68 the shaft 66 is driven by a sprocket chain or belt 69 running over a pulley 70, which goes to the aforesaid clutch mechanism, and which sprocket chain or belt 69 has driving connection with the drive shaft of an electric motor 71, which is the source of power. The change speed mechanism is of a well-known type wherein horizontally-positioned levers 72 and 73 are pivoted at 74 and 75, respectively, on each side of the endless friction member 64. The lever 72 carries two of the discs 63 and 65 on one side of said friction member and the lever 73 carries the other pair of discs. By means of a screw member 76 and a hand wheel 77 thereon the discs 65 are brought together and the discs 63 are correspondingly separated, or vice versa. As the discs 65 are splined on the drive shaft 66 and the discs 63 on the drive shaft 62, the effect of this is to positively change the speed of pulley 59, and that of main drive shaft 56 either faster or slower, as may be desired. Tachometer mechanism 78 of well-known construction gives a reading of the speed at which the shaft 56 is driven. In this manner the speed of rotation of the drum of hollow spindle 27 and its head plate 25 carried thereby may be regulated and determined so that the time of angular movement between any two of rods 31 or from weld to weld can be made constant for various diameters of well screens being manufactured on the machine, and which embody correspondingly varied numbers of rods 31.

The above indicated instrumentalities provide means for rotating the hollow spindle 27, head plate 25 and the group of rods 31 carried thereby at a suitable speed to coil the wire on the cylindrical cage of rods (helically, because of endwise movement of the rods as hereinafter described) and to permit effective welding of wire and rods at all their crossing points. The corresponding holding plate 39 is rotated at exactly the same speed by the following means:

A spur gear 79, Fig. 6, of the same diameter and pitch as spur gear 55 meshes with the ring gear 53 and is fast on a longitudinally-extended shaft 80. This shaft extends the entire length of the machine and is journaled to rotate in a bearing 200 formed in a boss 201 connected with the transverse frame member 15 at the head of the machine, and in a bearing formed in a boss 202 connected with the transverse member or tail stock 16 secured at the rear of the machine. As best shown in Fig. 13, the shaft 80 has splined and adapted to slide thereon a spur gear 81, of the same size and pitch as spur gears 55 and 79, which meshes with the spur gear 46 mounted on and carried by the casting 45, to which the rod-end holding plate 39 is secured. As shown in detail in Fig. 15, the spur gear 81 is fast on a feathered sleeve 82 which is journaled in a depending boss 83 on a transverse portion 84 of a tail carriage hereinafter to be desecribed and which carriage is adapted to be moved longitudinally of the shaft 80. The gear 46 is mounted on and moves longitudinally with the tail carriage 84 and is in mesh with gear 81 which through the medium of feathered sleeve 82 is driven from and rotates with shaft 80 and is continuously held in mesh therewith by means hereinafter described.

The extent of drive shaft 80 between its supports at 200 and 202 is too great to be unsupported between these points when the bearing support 83 on the tail carriage 84 is at or near either of the ends of the bed. At the same time said support and the spur gear 81 must be free to travel the length of shaft 80. I have, therefore, provided a disappearing bearing 203, which is an extended link concaved on its under side, as indicated at 204, which takes against shaft 80 as shown in Fig. 16. This link is pivotally connected at its ends with two forks 205 and 206 which are fast on sleeves 207 and 208 fast on transverse rods 209 and 210 journaled in the main frame. A weighted arm 211 fast on the rod 210 normally holds the bearing link 203 in horizontal position to take against the shaft 80. When, however, the carriage 84 is moved in either direction to and past said bearing link 203 it is pushed out of the way by means of a double-ended pusher-piece 212 carried by a depending bracket 213 which is secured to the carriage 84, as clearly shown in Fig. 14. Since the gear 46 has the same diameter as ring gear 53, and since both are driven by pinions of the same diameter rotated at the same speed, it follows that the rod-end holding plate 39 is always rotated at the same speed as the hollow spindle 27 and head plate 25, regardless of how widely these two holding and guiding plates may be separated.

*Endwise rod-moving means to determine widths of strainer slots*

As shown in Fig. 14, the shaft 48 heretofore referred to is held fixed within a boss 85 formed as part of a bracket 86 formed on tail carriage 84. This carriage is supported upon an axle 88 having journaled thereon by ball bearings or otherwise a pair of flanged wheels or rollers 89, 90. These rollers engage the upper surfaces of the inwardly-turned horizontal portions 91 and 92 of the frame members 13 and 14, with the flanges of said wheels taking inside of those portions. The shaft 48 is thus immovably held to the tail-carriage 84, and said carriage and the parts connected therewith, including the gears 46 and 81 and the rod-end holding plate 39, can move longitudinally only with and as the shaft 48 is moved longitudinally. A lead screw 93 of the proper length and preferably made integral with shaft 48 extends rearwardly from the tail carriage 84 through a stationary bracket 96 for the purpose of giving longitudinal movement to the tail-carriage as will be presently shown. The lead screw 93 passes through an opening 94 in a boss 95 formed on the bracket 96 on tail stock 16, which is bolted to the bed pieces 13 and 14. Surrounding the opening 94 and forming a bearing within the boss 96 is a sleeve 97 upon which is rigidly secured spur gears 98 and 103. A thrust-bearing 101 is interposed between the end of boss 95 and the hub face of spur gear 98. The bushing or bearing 97 is provided with a lining 102 of some soft metal which will hold and guide the lead-screw 93 but will not affect it to produce wear thereon. This means of support is well shown in Figs. 2, 4, and 16.

The gear 98 may have secured thereto a multiplicity of different-sized gears for effecting change speeds at the rear end of the machine otherwise than in the manner shown at the front end of the machine and hereinafter described. One such additional gear 103 is shown, said additional gear (or any number of such additional gears as may be desired) being held by means of bolts 104, 105 carrying enlarged bosses 106, 107, Fig. 4, which bosses are surrounded by sleeves 108, 109 formed integral with arms 110, 111, Fig. 17, each arm adapted to swing along the face of gear 103 about the axis of its respective sleeve. As shown in Fig. 4, nuts 112 on the threaded ends of bolts 104, 105 bring the heads 113 of said bolts into position for retaining the sleeves 108, 109, respectively, and the arms 110 and 111 carried thereby, in operative position, and further secure the gears 98 and 103, or any number of such gears, together in suitable operative relation.

Arm 110 carries one half 114 and arm 111 the other half 115 of an elongated split nut. As shown in Fig. 17, when the arms 110, 111 are swung inwardly toward the lead-screen 93 the meeting faces 116 of said portions 114, 115 of the split nut come together in a plane which passes through the axis of shaft 48, lead-screw 93 and sleeves 108, 109, and in that position the internal threads of the split nut engage the threads of lead-screw 93. The portions 114, 115 of said split nut have semi-conical outer surfaces 117, 118 as shown in Fig. 4, which are adapted to be engaged by a similar conical inner surface of a sleeve 119. This sleeve has an internally threaded end 120 adapted to be screwed upon a combined threaded portion 121 of the split nut formed by parts 114, 115. In this manner the split nut is firmly clamped with the faces 116 of its parts in contact and the internal threads of the nut engaging the threads of lead-screw 93. The sleeve 119 is preferably burred, as shown in Fig. 2, so that it may be unscrewed or screwed up firmly by hand. When this is done the split nut will be in effect united with the gear 98 (or 103) and will rotate with it. By such rotation its threads engaging the threads of the lead-screw 93 will cause said lead-screw and the parts connected therewith to move longitudinally of the machine in a straight line. As heretofore stated, the shaft 48 extends within the rotatable sleeve casting 45, 47 which carries the gear 46 and the rod-end holding head-plate 39. All of these are constrained to move longitudinally with the longitudinal movement of shaft 48 and lead-screw 93 by reason of the fact that said shaft 48 carries at its front end a combined thrust and radial bearing 123 which takes against a shoulder 124 of the sleeve casting 45 and is secured in permanent position by a nut 125 threaded onto the reduced portion 122 of shaft 48. Free rotation of the sleeve casting 45 carrying gear 46 and the rod-end holding head-plate 39 is secured by means of journal bearing 47 and combined radial and thrust bearing 123 on shaft 48.

It is obvious that by rotating the gear 98 (or 103) at different speeds, the rate of longitudinal travel of the lead-screw 93 and the shaft 48 will be correspondingly changed. And if the surface of the cylinder outlined by the rods 31 is rotated at a speed which is definitely related to the rate of rotation of the gear 98 and its attached parts, such changes in the speed of longitudinal travel of the lead-screw 93 and the parts carried with it will be reflected in a change of the pitch or distance apart of successive coils of the helix formed of the wire wound on said outlined cylindrical surface; that is, the width of drainage slot formed between successive coils of said helically-wound wire will be greater or less in proportion as the speed of rotation of the gear 98 and its attached split nut is greater or less, with constant revolution of said outlined cylindrical surface. Since extreme accuracy in the width of the drainage slot is necessary, it is essential that uneven or jerky movements of the lead-screw and its attached parts which govern this factor be avoided. To this end I prefer that the power exerted by the lead-screw 93 be directly alined with the resistance offered by the circle of rods 31 when pulled across anvils 37 and preferably the head-stock spindle 27, tail carriage 84, and lead-screw 93 are arranged in axial alinement.

Since it is essential in the manufacture of well screens to provide screens with a large number of different widths of drainage slot, means are provided herein for giving to the gear 98 any one of a series of predetermined relative rotation speeds, and consequently, to the lead-screw 93 any one of a series of predetermined longitudinal speeds, resulting in the production of a series of screens having severally one, and in the series all, of said widths of drainage slots.

To effect this, shaft 126 of substantially the same length as shaft 80 and lead-screw 93 is rotatably mounted in a front-end bearing 127 formed in a boss 128 secured to transverse frame piece 15, in a rear-end bearing 129 formed on tail-stock 16, and in a central bearing formed in a boss 130 which is a part of a bracket 131 bolted to the side of longitudinal frame piece 13, as shown in Figs. 7, 9, 13 and 14. Referring to Figs. 7 and 18, a gear carrier 132 is provided which embodies a pair of spaced arms bolted together as indicated at 133 and 134. Within hub members 135 of the gear carrier so formed is a bearing sleeve 136 which is splined so as to be slidable upon shaft 126 by means of a key 137, as clearly shown in Figs. 7 and 18. Fast on the sleeve 136 so as to rotate therewith, is a spur gear 138 which meshes with a pinion 139 which, together with a spur gear 140, is fast on a short shaft 141 which has its ends journaled in bearing hubs 142 formed in the gear carrier 132. Connected with the end of the gear carrier 132 is a piece or bracket 143 which carries a handle 144 having formed therein a socket 145 through which extends a spindle 146 surrounded by a compression spring 147. The spindle is provided with a head 148 by means of which it is retracted as desired, and also with a nose or pawl 149 adapted to enter any one of a series of holes 150 in a plate 151 of arcuate cross-section which is secured to the frame. This plate is provided with a multiplicity of slots 152 opening in the lower edge thereof in positions corresponding to those of the holes 150 to receive the piece 143.

The gear carrier, and the gears carried thereby, including the driving gear 138 on shaft 126, may be moved longitudinally along said shaft to take any of the positions determined by the holes 150 and the slots 152. Adjacent one group of said slots (shown as nine in number) are a multiplicity of spur gears called cluster gears 153 each of which is of a different diameter from the other and all of which are fast on the drive shaft 56. When the gear carrier 132 is moved along the shaft 126, and the piece 143 is positioned in any of this group of slots 152 and the pawl 149 in a corresponding hole 150, gear 140 will be caused to mesh with the alining gear 153, and the shaft 126 will be driven thereby through pinion 139 and driving gear 138. And it follows that said shaft 126 will be driven at a different rate of speed by each of the different sized gears 153, which speed-rate is definitely related to the rate of rotation of hollow spindle 27 and heads 25 and 39, because all are driven, directly or through intermediate gearing, by the main drive shaft 56.

To increase the number of change speeds without increasing the diameters of the cluster gearing so as to render it inconvenient or impractical to apply the gears of the gear carrier thereto, a sleeve 154 is mounted to rotate freely on shaft 56, and upon sleeve 154 are secured a multiplicity or cluster (here shown as 6) of spur gears 155 of varying diameters increasing from the smallest at the left to the largest at the right. The sleeve 154 has fixed thereon a pinion 156 which meshes with a gear 157 on a shaft 158 journaled in a box 159, and on the other end of the short shaft 158 is a gear 160 which meshes with the gear 55 on shaft 56. Gears 55 and 160 are of the same diameter but gear 157 is larger and pinion 156 is smaller. By these means the sleeve 154 is driven in the same direction as shaft 56 but at greater speed, so that the smallest gear 155 has a circumferential speed greater than that of the largest gear 153. Thus the speed of rotation of the shaft 126 may be varied in the construction shown through fifteen different speeds, determined by driving the shaft 126 from gears 138, 139 and 140 by the smallest gear 153 up to the largest gear 153, and thereafter by the smallest gear 155 up to the largest gear 155. This drive is communicated to the gears 98 and 103 and the split nut carried thereby by means of one or the other gears 161, 162 fast on a sleeve 163 which is splined on a shaft 126 to be moved lengthwise thereof and is held in adjusted position by a set bolt 164, as best shown in Fig. 2.

This arrangement permits gear 161 to mesh with gear 103 (as shown) or the smaller gear 162 to mesh with gear 98, thus permitting double the number of changes of rate of rotation of the split nut and, consequently, double the number of changes of endwise movement of the lead-screw 93. And, as heretofore stated, the nest of gears 98 and 103 shown may be increased in number and the nest of gears 161, 162 may be correspondingly increased in number within the scope of my invention, still further to multiply the possible number of speeds at which the split nut will be rotated and the lead-screw 93 longitudinally advanced.

This driving means, whichever gear or set of gears is selected, is definite and positive, and provides longitudinal movement for spacing the coils of the helix definite and certain distances throughout the wire-winding operation, thus to give strainer spaces between the coils of uniformly fixed widths for any particular gear combination selected. Although I have shown fifteen such gear numbers adapted to give fifteen sizes or widths of strainer slots (which number will be multiplied by the number of gear combinations 98, 103, 161, 162 provided), I do not wish to be limited to any particular number of sizes or any particular widths of slots, as it is within the scope of my invention to provide any number and size of different widths of strainer slots, which are suitable for the work of a well strainer.

The lead-screw 93 will be so long when the tail carriage 84 and parts connected therewith are at or near the front of the machine in the early stages of the operation, that it is desirable or necessary to provide a support for this shaft. This support is shown in detail in Figs. 2, 4 and 16, and embodies, in conjunction therewith, means for manually moving the tail carriage 84, lead-screw 93 and parts connected therewith when the split nut is open in non-thread-engaging position. For this support and movement a truck 165 is provided, which is mounted upon sets of rollers 166, 167 journaled upon said truck and adapted to run on the flange tracks 91 and 92 of the side frame pieces 13 and 14. Upon this truck are a pair of uprights 168, 169, between which is a spool or a spool-shaped roller 170 of some non-abrasive material, as wood or composition. This roller is freely rotatable upon a short axle 171 supported by the uprights 168, 169. The concaved portion 172 of the spool 170 is such as to engage the lower cylindrical half of the lead-screw 93 so as to be adapted to move freely along it and to support the same without wear or injury to the threads.

For causing the truck and supporting roller to move longitudinally of the machine as the lead-screw 93 is moved, I provide a pair of racks 173, 174 outside of the rollers 166, 167 and fast on the flanges 91 and 92 of frame pieces 13 and 14. Upon a transverse shaft 175 journaled in the truck 165 there are fastened a pair of spur gears 176 and 177 which rest upon and mesh with the racks 173 and 174. A second pair of racks 178, 179 are securely bolted at 180 and 181 at their forward ends to the movable carriage 84 which supports the gearing 46, 81. The racks 178, 179 ride upon and mesh with the gears 176 and 177, being held in position thereon by the gibs 182, 183 bolted to the truck 165 as clearly shown in Fig. 16. It follows that when the above construction as to carriage 84 and parts carried thereby, including lead-screw 93, is moved longitudinally along the frame the teeth of racks 178, 179 will be caused to move gears 176, 177, meshing with both sets of racks, with the result that the truck 165 and the supporting spool 170 will travel along the bed of the machine at a rate one half as fast as the rate of longitudinal travel of the lead-screw 93, so that said support stands at all times at the middle point between the supports for said shaft on carriage 84 and tail-stock 96.

A crank 184 is secured to the shaft 175, and when the knurled sleeve 119 is unscrewed from the split nut and the portions 114, 115 of said split nut are separated to free the lead-screw 93, the said lead-screw and the carriage 84 to which it is connected can readily and rapidly be moved manually along the bed, as desired, by rotation of said crank, the rate of travel, of course, being doubled when it is moved by the crank and gears 175, 176 by reason of the fact that said gears mesh with both sets of racks. A stand 186 in fixed position at the end of the machine is provided with holding socket 187 for receiving and holding the screw-sleeve 119 when the same is removed from the split nut.

The wire holding and guiding means

As shown in Fig. 35, the longitudinal rods may have various shapes, such as that of the round rod 18, the ovate rod having a pointed upper end 20, or the grooved rod having pointed upper ends 23 and 24, or other shapes, as found desirable. These rods are held by the means hereinbefore described, so that in the wire winding and welding plane they define with their outer limits a circle forming substantially a circumference of a cylinder. Considering only the part of the cylinder in the winding and welding plane, it is in effect simultaneously rotated and advanced longitudinally as hereinbefore described. Whatever the cross-sectional shape of the rods 31, in practice the deformed or smaller cross-sectional portion of said rods, as the portion 20 of rod 19, or the portions 23 and 24 of rod 21, will be turned outwardly to form the outer limits of said defined circle. The wire to be helically wound upon said rods in practice will be of general rhomboidal cross-section with converging side walls, a wider flat top face and a narrower inner face, which inner face may be flat or rounded or otherwise shaped, as desired. It is necessary, however, to hold the said wire so that the wider flat face will at all times be turned outwardly and held in planes parallel to the axis of rotation of the head 25 and of the cylinder outlined by the rods, with the smaller face or edge of said wire inturned and contacting the outturned faces or edges of the rods 31.

Means for holding and guiding the said wire, and some modifications thereof, are shown herein. The means shown in Figs. 1, 5, 8 and 9 comprise a post 188 of rectangular cross-section mounted to slide vertically in a guideway 189 formed in a bracket boss 190 which consists of an extension of transverse member 15. As shown in Fig. 1, the face of the bracket boss 190 is provided with a cover or plate 191 secured in position by bolts 192. The rectangular post 188 is, as shown in Fig. 1, of less width than the guideway 189 and said post is held in any desired adjusted position, both vertically and laterally, by means of set-bolts 193. The post 188 has formed at its top a cylindrical portion 194, as shown in Fig. 5. Adjustably held on this cylindrical portion is a bracket 195 which is held fast on said cylindrical portion 194 by means of a split portion 196 surrounding the same and clamped thereto by bolts 197, as clearly shown in Figs. 1 and 5. The bracket 195 is provided with a top 198 which has formed therein a groove 199. This groove extends lengthwise of the top 198 at approximately its transverse center and in said groove is a tongue-like guide piece 214 which is securely held in any desired adjusted position within the groove by means of set-screws 215 and 216.

The lands 217 and 218 of top 198 are drilled with holes 219 and 220 respectively with are on opposite sides of and parallel to groove 199 and staggered in relation to each other. Said holes or sockets are provided with studs 221 bearing on their tops above lands 217 and 218 eccentric pintles 225 for the reception of rolls 227. The position of the pintles 225 with reference to the groove 199 is determined by the rotation of studs 221 in their sockets 219 and 220, the desired positions being made secure by set screws 222 bearing against the studs. It is needful in order to produce a welded well screen having a helical winding of flat-topped wire to lead the wire to the welding position so straightened laterally as to be free from bends and therefore capable of being laid parallel to and at a constant distance from the coil last laid, and also that its flat top be guided to a constant position so that when welded in place its top lies in the same cylindrical plane as the wire already laid. It is necessary as well to lead the wrapping wire 229 through the straightening and guiding means to the welding position with the least tension possible for reasons which will hereafter be shown. These results are secured in my construction by mounting the rolls 227 between which the wire 229 passes, on ball or roller bearings (22a) of approved type to reduce the drag or tension on the wire to its lowest terms, and by forming the grooves in the periphery of the rolls 227, as shown in Fig. 27, to the exact shape of the portion of the wire 229 in contact with each. The roll may and usually does in practice envelop the wire 229 to its midsection. It is obvious therefore that the assembly of rolls 227 provides the means for straightening the wires 229 laterally and guiding it accurately with reference to the transverse axis of its cross-section. As various shapes and sizes of cross-section of the wrapping wire 229 are to be used it is only necessary to provide a set of rolls 227, as in Fig. 26, adapted to each and place the set in position on the pintles 225, giving such adjustment to studs 221 as may be necessary.

This wire 229 coming off of any suitable source of supply, as a coil on a suitably supported reel (not shown), will be fed along the grooves 230 of rollers 227 and 228 and through a guide groove 231 preferably enveloping the wire on a nose 232 formed on the adjustable tongue 198. The tongue 198 is easily removable so as to be replaced by a similar one having a nose 232 adapted to guide a wire 229 of different cross-section. The tongue 198 carrying nose 232 may be elevated or depressed from the horizontal plane of the grooves 230 in the guide rollers 227 and 228 or extended longitudinally therefrom and is adapted to be adjusted so as to hold the wire 229 in a straight line extending from the last of said rods 31 as said rods are successively caused to engage said wire as the cylinder of rods is rotated by the heads 25 and 39.

By these means the wire 229, whatever its shape, is held in a fixed position so that its top surface at the welding point will always be held in a plane parallel to the axis of the head 25 and the cylindrical well screen being formed thereon. Furthermore, as clearly shown in Fig. 8, the wire 229 will be held in such manner as to cause it to contact and preferably bend over the rod 31 next to and in advance of the rod 31 which is at the point of welding. There are two purposes served by so guiding and holding the wire 229. One is to give the final position to that portion of the wire extending between the rod 31 at the welding point and the next succeeding rod 31 as it will have when the screen is completed. That is, so that there will be no further movement of the wire 229 after the weld, which insures welds that are unbroken and undeformed and insures that the wire will remain in the desired position. A second function is to take up by this bending across a rod in advance of the point of welding some part of the tension strain necessarily imposed upon wire 229 as it is guided, straightened and wound. The guiding and straightening effect of the rolls 227 and 228 and the guide grooves 232 also will result in perfectly straightening that portion of the wire which extends from the last groove 230 and through the guide 231 of the nose 232 to the rod 31 with which it first contacts and over which it is bent.

The bracket 195 on post 188 may be raised or lowered and the tongue piece 198 may be adjusted in or out on said bracket, to adapt the straightening, guiding and holding means to be correctly positioned for properly laying the wire 229 on the various diameters of well screen which may be manufactured. Further, by means of the set-bolts 192, 193, the post may be adjusted laterally at such times so as to bring the wire 229 exactly into the right position to be fed to a contact ring 233 on a welding disc 234 hereinafter to be described. As shown in Figs. 19, 23 and 24, this contact ring also has an important function in guiding and holding the wire 229 until after welding takes place. The contact ring 233 is preferably made of a very hard but good electrical conducting material, such as elkonite, and is secured in position on the welding disc 234 by silver soldering. The contact ring is formed with an annular top face 235 and with an annular flange having a vertical wall 236. These walls are in such position that the wire 229 as it is fed is caused to contact the top face 235 with its upper plane surface and with its side edge the vertical wall 236. As shown in Fig. 24, the wire 229 is fed so as to move at a slight angle against the wall 236 of contact piece 233, which causes the adjacent edge of the wire to be held firmly in contact laterally with said flange 236, and which results in its always being positioned in the same vertical plane of the welding disc 234 at each welding operation, and, more important than that, insures always a definitely and certainly fixed position laterally for the edges of the plane top face of the wire 229 at the moment of welding. This effects an absolutely uniform spacing of the coils of the helix and correspondingly continuously uniform width of drainage slot, which is essential for a satisfactorily efficient well screen.

In Figs. 10 and 11 a modification of the means for supporting the bracket 195 and the parts carried thereby is shown. In this modification the cylindrical portion 194 is pivotally connected with post 188 by means of an ear 237 which engages between corresponding ears of a fork 238 on post 188, and which is held in any desired position of angular adjustment by means of a setbolt 239. By this means the bracket 193 and parts carried thereby may be fixed in any desired position of angular adjustment relative to post 188. In this form, as best shown in Fig. 12, the post 188 is extended downwardly alongside of frame-piece 14 between two blocks 240 having secured thereto threaded studs 241, which by means of nuts 242 and keeper bars 243 secure the post 188, in a vertically adjustable position, to the side of frame-piece 14. As shown in Figs. 10 and 12, set-bolts 442 and 443 are threaded through the blocks 240 and engage the sides of post 188 by means of which said post is adjustable laterally along the face of frame piece 14. By these means the post 188 may be adjusted vertically and laterally, so as to insure that the rolls 227 and 228 and the guide in the nose 232 will be properly positioned relative to the welding plane of welding ring 234 and through contact piece 233 carried thereby, to hold and guide the wire 229 for each and any diameter of well screen which the machine is adapted to make.

*The welding mechanism*

The welding disc 234, heretofore referred to, comprises two pieces 244 and 245 each formed with central annular hub pieces 246, 247, best shown in Fig. 19, and secured together by a multiplicity of screws 248, by which means a wheel-like member is provided of good electrical conducting material with a hub having bearing portions on either side of the central plane of said member. The contact ring 233 is carried by this member between the sections 244 and 245.

The hub portions are held in good electrical-conducting contact bearings formed in side pieces 249 and 250. Side piece 250 is made integral with carrier block 252 and side piece 249 is secured by screws 251 to carrier block 252 having thereon a boss 253. The boss 253 is provided with a circular seat 254, which receives a trunnion 255 on the end of a carrier-post 256, as best shown in Fig. 8. The carrier-post runs through a tubular block 257 cut away at one side and formed with a split head, indicated at 258 in Fig. 8. This head is surrounded by a clamping ring 259 secured by a set-bolt 260. By this means the post 256 is securely held in any desired position of longitudinal or angular adjustment in carrier block 257.

The block 257 is formed with an extension arm 262 having in the end thereof an insulating seat 263 engaged by a pivot screw 264 threaded into crank arm 265 fast on a shaft 266 journaled in bearings in frame brackets 267 and 268. The shaft 266 projects longitudinally of the machine to the front of these bearings, as clearly shown in Figs. 1 and 5, so as to have a projecting portion beyond the bearing in bracket 267. The crank arm 265 is secured to the shaft 266 adjacent said bearing, and another similar crank arm 269 is secured to the end of said shaft 266 and has thereon a second pivot bolt 270 in alinement with pivot bolt 264 and engaging an insulating seat 271 in the block 257. The post 256 and the parts carried thereby are all pivotally connected in the line of the pivot bolts 264 and 270 to the offset or crank arms 265 and 269 on shaft 266, and may move in a plane passing through the axis of the post 256 and parallel with the axis of the shaft 266.

To prevent any swinging movement of the welding disc 234, and at the same time to permit the aforesaid up-and-down movement thereof, in the form of Figs. 7, 8 and 9, I secure a bar 272 to the carrier block 257 by means of bolts 273. This bar 272 is connected by a pair of substantially horizontal links 274, formed of insulating material, to a bracket stand 275.

And to create and regulate a suitable downward pressure of welding disc 234 I mount fast on shaft 266 the hub 276 of an elbow lever one of whose arms 277 is substantially horizontal and is connected by a tension spring 278 with the frame of the machine. The vertical arm 279 of the lever, as shown in Fig. 7, has adjacent its end an aperture 280 through which extends a bolt 281 which is rigidly secured to a bracket 282 fast on the frame-stand 267. By means of nuts 283 on the threaded end of bolt 281 engaging a washer sleeve 284 surrounding bolt 280 between nuts 283 and arm 279, the levers 277, 279 may be rocked with shaft 266 and a limit put to the action of tension spring 278 for exerting a suitable pressure through the welding disc 234 upon wire 229 as it is guided and wound upon the cylinder of rods 31.

To furnish electric current for the welding operation the lead-in wire 285 has a primary circuit going through a choke 285 and transformer mechanism 287, where the voltage is suitably reduced and the amount of voltage determined by means of scale 288 on the choke and 289 on the transformer. For the purposes of the welding operation it is essential not only that the current be reduced to low voltage (in practice around 2¼ volts), but that the flow of current shall be very large. To permit this large flow of electric current a conductor 290 comprising a multiplicity of copper leaves or strips has one end secured by means of bolts 291 and a plate 292 to the carrier-block 252. The other end of conductor 290 is secured by means of bolts 293 and a plate 294 to one end 295 of the copper secondary 296 of transformer 287. As clearly shown, the copper-strip conductor 290 is sufficiently long between its points of attachment to form a broadly circular U. This U-shaped elongation, taken in connection with the flexibility of the copper strips comprising the conductor 290, permits the vertical adjustment of carrier post 256 to adapt the welding mechanism for screens of different diameters, and likewise permits the slight oscillating up-and-down movement of the post 256 and the welding disc carried thereby on crank arms 265 and 269. It further permits the oscillation of the welding disc 234 and means supporting it which is provided for in the modification of Figs. 9–12.

The secondary or induced current caused to flow through conductor 290 and to carrier-block 252 is transmitted through the welding disc 234 and the elkonite contact ring 233 across the wire 229 and the rods 31 at their successive crossing points; thence through the rod-holding anvil pieces 34 in succession to the head plate 25, and from there into the circular contact ring 54 fast on the outside of hollow spindle 27.

The contact ring 54, which rotates with the hollow spindle 27, engages a pair of segmental contact shoes 297 and 298 with a tongue and groove contact as shown at 299 in Fig. 3. The tongue is formed in the shoes 297 and 298 and the groove is an annular groove in the contact ring 54. The two segmental shoes 297 and 298 extend substantially about the upper half of the contact ring 54. They are of considerable weight, and are retained seated in position on the contact ring by gravity. The two shoes are slightly separated at a point at the top and in about the vertical diameter of the contact ring 54 and are loosely secured together at that point by a link 200, as best shown in Fig. 8.

An electrical conductor 301 formed of copper strips is secured to the shoe 297 by means of bolts 302 and a clamp bar 303, and is also secured to shoe 298 by means of bolts 304 and a clamp bar 305. The bolts 304 and clamp bar 305 also secure to shoe 298 a conductor 306 formed of copper strips, which in turn is secured to a conductor piece 307 by means of bolts 308 and clamp piece 309. The conductor piece 307 is secured in conducting relation to the other end 310 of copper secondary 296 of transformer 286, all as best shown in Figs. 8 and 11. In order to restrain the shoes 297 and 298 from moving with the contact ring 54 on the hollow spindle 27, a tie rod 311 is connected at one end to one of the bolts 302 and at the other end to a bracket 312 fast on the frame, as shown in Figs. 1 and 12.

The above-described electrical conductors and connected parts comprise a short electrical circuit adapted to carry a large flow of secondary or induced current at low voltage. This circuit is insulated from the frame on the lead-in side so that the large flow of current is normally concentrated for delivery through welding disc 34 and contact ring 233 to successive crossing points of wire 229 with rods 31, and to, and through and across, said wire and rods at their crossing points. And this concentration of such current is adapted to produce exactly the desired temperature to effect initial fusion and the beginning of welding of the wire 229 with the rods 31 at their successive crossing points.

The above-referred-to concentration of current is desirable or essential at the beginning of the welding action to fuse the metal of the crossing wire and rod at their adjacent surfaces so that they will sink together a predetermined desired distance. When, however, that softening and fusion has taken place it is essential to dissipate some of the current, and, further, to check the sinking together of wire and rod so that the top surface of wire 229 in each coil will always lie in the longitudinal planes of the top surfaces of other coils, and which planes are parallel to the axis of the well screen.

The means for effecting these highly important steps of my process are well illustrated in Fig. 23, having reference also to the showing in Fig. 19. In Fig. 23 the parts are shown in the position they occupy just before the beginning of the welding operation, wherein the wire 229 has its upper surface in contact with the bottom contact wall 235 of the contact ring 233 and has the front edge of that surface in contact with the side wall 236 of said contact ring, and wherein the metal has not been softened by the welding operation. In this position the portion 246 of the contact disc 234 has its lower edge 430 overlying one or more of the theretofore welded helical coils of wire 229, and is spaced from the top surfaces thereof a distance equal to the amount which it is proposed to sink wire 229 and rod 31 together at their crossing point during welding, as indicated at 431. Correspondingly, the portion 246 of welding disc 234 has its lower edge 432 (in line with the lower edge 433 of the contact ring 233) so extended as to be spaced from the contiguous upper surface of rod 31 the same distance as edge 430 is spaced from the upper surface of the welded coils of wire as indicated at 434.

When, therefore, the initial welding action takes place, and the adjacent portions of wire 229 and rod 31, as indicated at 435, are softened and fused together, the downward thrust of the welding disc, effected by gravity and the force of spring 278, will cause the softened metal of the rod and wire to flow together and will sink the one into the other at 435 until the edge 430 contacts with the upper surfaces of previously-welded coils of wire 229, and the combined edge 432, 433 at the same time contacts with the upper surface of rod 31, thus closing the separating spaces 431 and 434.

These contacts have a double effect. First, the flow of current is to a considerable extent dissipated, passing into previously-welded coils of wire 229 and into rod 31 over a considerable longitudinal extent thereof, which relieves the concentration of current through contact point 435 of wire and rod and reduces the temperature at that point so that excessive fusion is effectively avoided and the strength of the wire 229 and the rod 31 is thereby conserved. A further essential effect is to bring the top portion of the coil then being welded exactly in the plane of other coil tops whereby the top planes of all helical coils are caused to extend in common planes parallel with the axis of the well screen, with the result that the outer surface of the well screen is, except for the drainage slots therein, smooth and continuous and in effect outlines a substantially uniform cylindrical surface.

Means are provided for controlling flow of electric current to pass through the aforesaid secondary circuit only during the period when the contact ring 233 engages a portion of wire 229 at such crossing point, and also to regulate the duration of flow of said current. These means consist of a circuit-closing and breaking device 313, shown in its generally operative position in Fig. 6 and in detail in Figs. 20 and 21. This device consists of a base member 314 mounted on a bracket 315 carried on casting 50. Electric wires 316 and 317 lead through conduit 318 and junction box 319 to the main source of electric current, and from junction box 319 the circuit formed by these wires is carried through a conduit 320 into a relay box 321. When the circuit of wires 316, 317 is closed by means hereinafter described, a relay of well-known construction within the relay box 321 is closed, which through wires extending through conduit 322 closes the primary circuit heretofore described.

As shown in Figs. 20 and 21, which embody an ordinary normally open machine limit switch, the wires 316 and 317 are carried to posts 323 and 324 set in an insulating plate 325 carried by base 314. Spring fingers 326 and 327 are held in circuit-making engagement with the posts 323 and 324 and have portions extending above a connector bar 328, which is pivotally secured by means of an insulating hub 329 fastened to the bar 328, and which hub is rotatably supported on a shaft-end 330 of an arm 331 fast on a rockshaft 332. This rockshaft is journaled between standards 333 and 334 on base 314, and carries a pair of arms 335 and 336 between the extremities of which is rotatably mounted a cam roller 337, and upon which is a table 338 engaged by a compression spring 339, which normally holds the roller in its upper position, and holds the arm 331 with the attached contact bar 328 in its lower position. When held in that normal position, the contact bar is separated from contact with the spring fingers 326, 327, and the electric circuit through wires 316 and 317 is normally held open, as shown in Figs. 20 and 21.

Although in the normal operation of the machine the rock-shaft 32 is rocked to bring the contact bar 328 into contact with fingers 326 and 327 to complete the circuit formed by wires 316 and 317 by means of a cam-engaging cam roller 337, as hereinafter described, it is desirable or necessary before the machine is started to make an initial weld of wire 229 with one of rods 31. This is made conveniently possible by means of a cord 340 having a handle 341 conveniently positioned, and which cord is attached to table 338 at 342, as shown in Figs. 1 and 21. By pulling the cord 340 by means of handle 341 the arm 331 and contact bar 328 will be rocked upwardly to close the aforesaid circuit, and in that manner make the initial weld.

The means for the cam arrangement for operating the make-and-break device shown in detail in Figs. 20 and 21 is illustrated in plan and side elevation in Figs. 1 and 6, respectively. As there shown, a spur gear 343 is fast on a short shaft 344 mounted in a bearing in bracket 315. This gear meshes with a second spur gear 345 on a shaft 346, which shaft has on it a spur gear 347 which is adapted to be interchanged with other gears to be substituted for gear 347 to adapt the apparatus for operation on well screens of different diameters, as hereinafter more fully explained. The gear 347 meshes with an idler gear 348 on a shaft 349 journaled in a crank-arm 362 which is secured to a split hub casting 350 surrounding a bearing stud 351, and which is held secured in adjusted position thereon by means of a set-bolt 352, as shown best in detail in Fig. 7. Within the bearing stud 351 is journaled a shaft 353 which has on one end thereof a pinion 354, and on the opposite end a cam disc 355 which engages with its outer surface the cam roller 337, as shown in Fig. 6.

The cam disc 355 has for the major part of its circumference a circular face or dwell 356 with a cam rise 357 at the proper point to close the circuit for effecting flow of current through the wire 229 and a rod 31 at one of their crossing points. The duration of the flow of such current is determined by the length of the cam face 357 engageable with the cam roller 337, and this length is made adjustable to be longer or shorter, for giving a longer or shorter duration of flow of current for welding action, by means of a segment piece 358 adapted to be mounted on and rotated about the shaft 353 and held in adjusted position on said shaft by means of a set-bolt 359 threaded into the segment piece 358 and taking in a slot 360 in the cam disc 355, as shown in direct and reverse positions in Figs. 9 and 6, respectively. The segment piece 358 is provided with a raised cam portion 361 having an outer surface formed in an arc of the same circle struck from the axis of cam disc 355 as is the surface of the cam portion 357 of said cam disc 355. The two cam surfaces 361 and 357 are thus in effect adapted to form one continuous surface. Hence by swinging the segment disc 358 a greater or less degree the extent of the effective cam surface formed of surfaces 357 and 361 may be increased or diminished and the duration of flow of current through the several crossing points of wire 229 and rods 31 will be correspondingly increased or diminished. By these means the time of flow of current may be accurately adjusted to produce the best welding action for whatever metal or alloy of wire and rods is employed.

The gear 347 is, as stated, replaceable by other gears. Gear 347 is of such a diameter in relation to the ring gear 53 on hollow spindle 27 as to effect exactly the number of operations of cam 337 to close the welding circuit through the relay circuit formed by the wires 316 and 317, which corresponds to the number of rods 31 in the particular diameter of well screen to be constructed. Since it is the purpose of the invention to have the rods spaced apart substantially the same distances circumferentially in all diameters of well screens, it is obvious that other sizes of well screens than that shown in the drawings will embody more rods where the diameters are larger and fewer rods where the diameters are less. For each diameter of well screen a particular gear corresponding to gear 347 is provided which will effect a number of operations of cam roller 337 for each revolution of the hollow spindle 27 corresponding to the number of rods in the diameter of well screen for which that particular gear is designed and fitted.

When, therefore, a different size of well screen is to be made on the machine there will be not only change of heads 25 and 39 for other heads adapted to the diameter of well screen which it is proposed to make, but also there must be a change of a driving gear for gear 347, which is adapted in its operation of cam roller 337 to the number of rods comprising the changed diameter of the well screen. To effect the change of gears it is only necessary to loosen set-bolt 352 and swing the crank-arm 362 carrying idle gear 348 sufficiently to permit the removal of gear 347 and installation of a substitute gear therefor and then to swing crank-arm 362 back so that gear 348 will mesh with the gear substituted for gear 347 and then, by means of set-bolt 352, to clamp the crank-arm 362 on the bearing stub 351. And with this re-arrangement of gearing the operation of cam roller 337 and of the relay circuit of wires 316 and 317 will continue to be properly timed and the number of operations of the circuit-breaker for each rotation of the hollow spindle 27 will continue to equal the number of rods 31 in the particular diameter of well screen then being made.

The welding disc 234 has normal rolling contact through elkonite contact ring 233 and the flange thereon with wire 229. I have discovered, however, that better welding action can be effected and better cooling after the welding action if relative movements of the portion of the surface of said ring 233 in contact with a bit of surface on wire 229 shall be prevented and the contacting surfaces be held stationary relative to each other during the welding period, and my invention, in the forms shown in Figs. 10, 11, and 12, includes means to effect such an operation.

As there shown, these means comprise a rocker-bar 363 pivoted at 364 to a bracket 365 adjustably secured by a bolt 366 to flange 92 of frame piece 14. On the rocking bar 363, which is substantially vertical, is a collar 367 adapted to be secured in any desired adjusted position on said rocker bar 363 by a set-bolt 368. Threaded into the collar 367 on the opposite side from set-bolt 368, as shown in Fig. 12, is a stud 369 which is provided with a bearing extension 370. Mounted on the bearing extension 370 and adapted to oscillate thereon is a link 371 carrying a boss 372 through which extends a rod 373, being held in adjusted position thereon by means of a pair of nuts 374 and 375 taking on each side of boss 372. The rod 373 is threaded into a connector member 376 of insulating material, which is pivotally conected between the arms of a forked bracket 377 fast on the carrier block 252, which, through various connections, suspends the welding disc 234 from the crank-arms 265 and 269 in bearings holding the same for freedom of oscillation in a transverse plane.

The rocker bar 363 is provided with an offset arm 378 which has journaled at one side thereof a cam roller 379 adapted to be held against the edge of a cam disc 380 fast on a shaft 381 journaled in a bearing boss 382 formed on a bracket 383 secured to the frame casting 49, as shown in Fig. 12. The arm 378 operates within a guide 384 formed in the bracket stand 383, which guideway is closed by a facing plate 385 secured by bolts 386 and 387, as shown in Fig. 10. The roller is held in yielding engagement against the face of cam disc 380 by means of a spring 388 connected with bar 363 and with an extension 389 of bracket member 383.

The shaft 381 is formed as a continuation of shaft 353, which operates the cam disc 355 for controlling the flow of current through the welding disc. And the cam disc 380 rotated by shaft 381 operates the cam roller 379 the same number of times per revolution of hollow spindle 27, in any case, as the cam disc 355 actuates the circuit breaker for controlling flow of electric current. It follows that the adjustment of rotation of said shaft by means of substitution of other gears for gear 347 to adapt the welding action to well screens of different diameters will also adapt the rocking action of the bar 363 to well screens of correspondingly different diameters. And the adjustable mounting of the collar 367 and the rod 373 adapts these connections for corresponding adjustments to well screens of greater or less diameter than that shown. The threaded portion of rod 373 in link 371 when fixed by the co-acting nuts 374 and 375 furnishes longitudinal adjustment to govern the position of the welding electrode whether forward of, on or back of the vertical axis of the circle of rods 31.

When the above instrumentalities for oscillating the electrode, formed of welding disc 234, and its carrying means, are employed, the arm 272, stand 275 and insulating links 274 are eliminated, since in the latter form the rod 373 stabilizes the welding disc and its carrier against undesired lateral or swinging movement. Further, the use of the arm 272 connected through links 274 to stand 275 would prevent the oscillation which is effected by the rod 373. It is to be noted that in the form where rod 373 and connections are used and link 272 eliminated, the connection to the electrode carrier is insulated from the frame because the connector block 376 is formed of insulating composition.

In operation the disc carrier and the body of the disc 234 are by these means oscillated so that the contact point of contact ring 233 on wire 229 above a rod 31 is caused to move synchronously with the wire 229 and the supporting rod beneath it just before, during and just subsequent to the welding action. This has a triple advantage,—first, it concentrates the flow of electric current into a very limited area of the circumference of contact ring 233 and wire 229 to pass the current through wire 229 and into the rod 31 at a crossing point. This effectively uses the very large amperage of electric current at low voltage which is available for the welding operation, and produces the requisite quick high heat to start the welding action.

Second, it allows of timing the motions so that the pressure applied by the weight of the top or rolling electrode and its attached parts is supported on the wire 229 during the heating, welding, and cooling periods directly over the rod 31 and anvil 34 so that there is no tendency to deform the wire 229 on either side of the crossing point.

Third, it holds the portion of wire 229 subject to the welding action in a position which is stationary relative to the welding portion of contact ring 233 not only before and during the period of welding action, but for an appreciable period thereafter, until cooling has materially progressed. This has an important advantage in that during the welding action the wire has become plastic and might be deformed if subjected to shock or jar such as might result from a rolling contact with the contact ring 233 on welding disc 234. Such a possible shock or jar is avoided by means above described which maintains the contacting surfaces of wire and contact disc stationary relative to each other for a period which is sufficient to permit the softened metal to cool after termination of the welding period below the plastic condition before relative movement again occurs.

To effect rapid cooling of the welding portions and prevent heating of the contact ring 233 and contact disc 234, I throw jets of water along the plane of rods 31 and across the wire 229 at the crossing points of wire and rods by means of a pair of inturned nozzles 390 and 391 preferably mounted on side piece 249 and connected with a water pipe 392 which is secured to a bracket 393 on side piece 249, as shown in Fig. 10. The pipe 392 is united by a flexible connector 394, as a rubber tubing, with a supply pipe 395 controlled by a hand-operated valve 396. The water discharged from these pipes passes down on to a drain-board 397 from which it flows into a pan 398, best shown in Fig. 6. From the pan 398 it is drawn through a pipe 399 by a pump 400 which forces the water through a pipe 401 back to a tank (not shown) from which the pipe 395 discharges to the nozzles 390 and 391. In this way the head of the welding operation is quickly and effectively removed.

It will be apparent from the statement of the above-defined means that the welding operation is performed automatically and efficiently, and it is a fact that it produces a highly effective and very satisfactory weld at each of the crossing points of wire 229 and rods 31, which does effect perfect metallic integration of wire and rods at all points of contact. It does this on well screens of any desired size within the limits of the diameter of hollow spindle 27, which, of course may be made as large in diameter as the requirements to be met demand. The various instrumentalities by means of which the welding operation is effected are not only automatic in action, but are easily modified so as to adapt them to the welding of well screens of any of the diameters within the aforesaid limits. This is accomplished in combination with means for supplying and accurately controlling electric current at low voltage and high amperage, which is requisite to effect the best welding operation.

*The means for finishing the well screen*

The well screen produced by the heretofore described instrumentalities comprises a continuous cylindrical member, of a length determined only in maximum extent by the length of the framework for supporting the longitudinally advancing means, in which there are a multiplicity of longitudinal rods equally spaced and each having a back appearance such as shown at 402 in Fig. 22, and upon which is a helix of wire having its coils spaced apart uniformly at whatever distance may have been selected for the particular well screen constructed, with each coil of the wire fused into and completely integrated with each rod at every crossing point of wire and rod. This is clearly shown at 403 in Fig. 22. As there illustrated, the metal of wire coils and longitudinal rods is fused together so that wire and rods at all crossing points are in fact metallically integrated.

The top surfaces 404 of the wire fall in planes parallel to the axis of the screen. The slots are narrower at the top, as indicated at 405, and wider at the bottom as indicated at 406, and are continuous throughout the circumference of the screen, outside of the rods as well as elsewhere, as clearly shown in Fig. 22.

When the winding of wire 229 has been terminated after the desired length of well screen has been fabricated, there will be left at each end of the well screen a multiplicity of rod-end extensions, as indicated at 407 and 408 on Fig. 22, which project beyond the helix of wire at both ends of the well screen. In that form the well screen is not in condition for practical use. To make it so I employ means cooperating with said extended rod-ends 407 and 408, as shown in Figs. 29 to 33 inclusive, to finish the screen and fit it for commercial use. These means comprise coupling pieces, 409, 410, of which coupling 409 is female being provided with internal threading 411, and coupling 410 is male being provided with external threading 412. The coupling heads 409 and 410 do not differ in any way excepting that head 409 is a female member and head 410 a male member. By these end-finishing members sections of the well-screen may be coupled together, or the well screen may have coupled to it a cap at one end and be coupled at the other end to piping, or any desired coupling may be made.

Each of the well screen heads 409, 410 comprises a cylindrical end portion 413 of an outer diameter equal to that of the outer diameter of the screen to be fitted. This portion 413 is provided with an extension 414 of an outer diameter equal to the inner diameter of the helically-wound wire wall of the well screen and is provided with open slots 415 adapted to receive the rod-end extensions 407, or 408, of the longitudinal rods 31. The slots 415 are continued as cylindrical holes 416 into the annular portion 413, as shown in dotted lines in Figs. 29 and 30, there being, of course, a number of such slots 415 and continuing holes 416 equal in any case to the number of rods 31 in the particular well screen being finished. The full-diameter portion 413 is provided with an inner wall 417 above the reduced-diameter portion 414, which wall is formed as a helix corresponding to the last helical coil of the well screen formed by wire 229, with the end of the helix offset in a transverse wall 418 to receive the end of helix 419 formed by the wire 229. When the finished member 410, or 409, has the portions 414 inserted inside of the well screen wall with the rods 31 taking along the grooves 415 and into the holes 416, the inner wall of portion 413 will closely fit the last helical coil 419 of wire 229, as clearly shown in Fig. 33. Holes 420 extend radially inward through the body of portion 413 across the longitudinal holes 416 and to a point beyond their inner limits, as shown in Fig. 32. These holes 420 are of somewhat larger diameter than the diameter of the rods 31, and, of course, all open outwardly in the portion 413, but do not extend through the same.

When a coupling-head 410, or 409, is assembled upon the end of the well screen, as shown in Fig. 21, the ends 407, or 408 Fig. 22, of rods 31 will be seated in the grooves 415 and holes 416 extending across the lower portions of radial holes 420. So positioned the well screen will be brought over a welding electrode or welding piece 421 formed on a supporting member 422, as shown in Fig. 33, and the welding plug 423 (shown in detail in Fig. 34) will be inserted in and extending above a hole 420 as indicated in dotted lines at 424 in Fig. 32. This plug will preferably be of the same material as that which comprises the well screen proper and the finishing member 410, or 409, although it is within the scope of my invention to form said finishing member of different material from that of which the screen is formed. When the parts are in this position a movable electrode 425 is applied to the protruding end 424 of plug 423 and at the same time pressure is applied to said plug and an electric current is passed through the same. This has the result of fusing the plug 423 within the hole 420 and to and around the wire end 407 (or 408), as shown at 426 in Fig. 33. The plug will also to an extent be fused into the portion 413 forming the walls of hole 420, so that by this means these finishing or coupling members will be integrally united with the body of the screen at the ends thereof. Then the entire screen, including the longitudinal rods 31, the helically-wound wire 229 and the end coupling pieces 409 and 410, will be metallically integrated and will comprise in effect one piece of metal formed with a continuous helical drainage slot running from one end of the screen to the other and multiplied in circumferential number by the number of helical coils formed in the winding of the wire.

*The well screen and its advantages*

This well screen so made, in accordance with the steps of my process, and by the hereinbefore-described machine for carrying out that process and the various steps thereof, comprises a unitary well screen construction with a substantially-smooth outer cylindrical surface formed of a multiplicity of helical coils of wire closely and uniformly spaced to provide continuous drainage slots between said coils, said slots being of uniform width and all metallically integrated by welding so that the completed well screen comprises, in effect and in fact, a single and integrally united piece of metal. This well screen has very great and distinct advantages over screens heretofore manufactured.

In the first place, its capacity for water-delivery on the basis of pumping power required is very greatly increased (in many sizes doubled) over water-delivery capacities on the same ratings of screens heretofore made. This is due to the uninterrupted character of the drainage slot, or of the drainage slots, considering each helical coil as providing a single circumferential slot, as compared to former structures. In the well screen of my invention there is not at the outside of the well screen any series of obstructions to inward flow of water caused by the presence of supporting metal going through to the outside.

A second advantage of my well screen, in some respects related to that above referred to as the first advantage, resides in its superior setting-in or development capacity. This is the adjustment of the gravel beds surrounding the well screen in which the vein of water or other liquid to be pumped lies, brought about by preliminary use of the well screen, in which a certain percentage of the finest sand or silt will pass through the slots and be discharged with the water, and which setting-in development or operation will continue until the grains of sand and gravel have arranged themselves about the well screen so that all of them are too large to pass through the drainage slots and no further grains will pass with the water. Under identical conditions of gravel bed and diameter and width of drainage slots, my well screen herein described requires nearly double the length of time required by other well screens to complete setting-in or development of the well in the sand or gravel strata carrying the water or other liquid to be screened. This means that the development or re-arrangement of the gravel and sand about the well screen is carried back much farther into the strata and is adapted to produce in the end freer and fuller flow and larger available supply of the water or other liquid.

A third great advantage resides in the fact that per unit of length for any diameter, and particularly for the larger diameters, the well screen of my invention herein employs much less material. It is lighter in weight for each unit of actual surface area and enormously lighter in weight for each unit of intake capacity.

A fourth great advantage of my well screen resides in the fact that, notwithstanding its light weight in comparison with known well screens, it is stronger and better able to resist the stresses set up in installation and use. Deformation of the screen walls as the same is being put down, by reason of contact with the walls of the well hole or with obstructions projecting into the well hole, do not take place readily, the well screen being in fact more rigid in resistance to deforming forces than other known well screens. But more important still, if deformation does take place it does not result in destroying effective screen surface, since the helical turns of wire are so completely fused into and integrated with the longitudinal rods that deformation of part of a wall of the well screen will not result in separating the wire from the rods but will maintain throughout the area of deformation substantially the same arrangement and relation, and consequently the same widths of drainage slots as before deformation.

A fifth advantage of my well screen which is a contributing factor to produce the results in respect to deformation above outlined, resides in the fact that I am able to use materials of much greater tensile strength than have ever been employed in the manufacture of well screens. This is made possible by the advantageous features of my process and by the extremely effective means for carrying out the process embodied in my machine.

A sixth advantage of my invention resides in its adaptability to the use of many different metals and alloys of metals. As now practiced, well screens embodying my invention are manufactured under the process and by the machine of my invention: (1) from steels of varying carbon content; (2) from pure or substantially pure irons, such as the brand of iron known as "Armco"; (3) from alloys of copper, silicon and manganese, such as "Everdur" embodying 96% copper, 3% silicon and 1% manganese; (4) from copper-nickel-zinc alloys, such as that known as "Ambrac", which contains 75% copper, 20% nickel and 5% zinc; and (5) from copper-nickel alloys such as that known as "Monel metal" which contains 30% of copper and 70% of nickel; and also from alloys of iron and chromium or iron chromium and nickel, known as "Stainless steels."

The above constitutes examples of effective application of my process for making well screens to many different types of metals and metal alloys. The list above given does not, of course, cover the entire number of such types, since it is within the scope of my invention to employ the process upon any known or discovered metal or metallic alloy which is capable of electric welding.

*Operation of the process and machine*

The above-indicated versatility of application of my process to many different types of metals and metallic alloys flows from the important and novel steps and combination of steps of my process, as heretofore pointed out, and from the efficient combination of instrumentalities for carrying out those steps comprised in my machine. The efficacy and utility of my process, and of the means for carrying it out embodied in my machine, resulting in the production of well screens having the above-noted advantages, have quite generally been pointed out in the description heretofore given. These advantages may be summarized by stating that in operation the machine has proved itself to be fully automatic and to produce with surprising rapidity and cheapness well screens of any of the metals hereinbefore referred to, with uniform metallic integration throughout, and with requirement of very small labor expense for operating supervision.

A general statement of the entire operation of the machine is as follows:

Before operation begins the necessary adjustments are made to adapt the machine for manufacturing well screens having a diameter, spacing of helical coils and consequent width of drainage slot therein which it is proposed to make. These adjustments include—(1) application to the hollow spindle 27 of the proper head 25 for the diameter of well screen selected; (2) application to the traveler-casting 45 secured to shaft 48 of a head 39 having rod-end holding apertures outlining a circle of the same diameter; (3) to bring the welding disc out of the line of movement of the rods 31 when they are inserted; (4) insertion of the rods 31 through the apertures in head 25, welding anvils 37 and into the rod-end holding apertures 38 and securing said rod-ends by means of the set-screws 40; (5) adjusting the wire tensioning, holding and guiding means for feeding the wire to the cylinder outlined by the rods for the size of well screen to be made and carrying the wire 229 through said holding and guiding means to a point in the welding plane beyond a rod in the welding position; (6) adjusting the carrier for the welding disc so as to bring the disc and the contact ring 233 thereon into the position shown in Figs. 19 and 23 where the welding disc rests freely upon the inserted end of wire 229 and is adapted to ride and roll thereon; (7) by use of the handle 341 and cord 340 operating the welding apparatus by hand to make the first weld of wire and rod to secure the wire for the beginning of the winding operation; (8) where the means for oscillating the welding disc carrier of Figs. 10, 11 and 12 is employed adjusting the pitman 373 for operation upon a well screen of the diameter selected (done finally at the same time that welding disc 234 is given its final adjustment); (9) applying to the shaft 60 346 for giving power to the circuit making and breaking device, a gear 347 of the proper size for the diameter of well screen selected; (10) moving the gear carrier 132 along shaft 126 so as to bring gear 140 into mesh with one or the other of the gears 153 or 155 to determine the width of drainage slot which has been selected for the screen to be constructed; (11) adjusting the speed of rotation of the hollow spindle 27 by means of change speed gearing and speedometer 78 to give a predetermined rate of welding, i. e., a predetermined number of welds per minute; and (12) finally securing the sleeve nut 119 upon the split nut 114, 115, so as to cause the internally threaded portions thereof to engage the lead screw 93.

Most of the above adjustments will only need to be made when it is proposed to change the machine for the manufacture of a screen of a different diameter from that which had been manufactured by the machine when it was last used. When, however, all the required adjustments have been made, the machine is ready to be operated to carry out the steps of my process for automatically and completely producing my metallically-integrated unitary well screen, except for the finishing step of the process in metallically integrating the end members with the well screen.

The motor is then started and the clutch op-operated to put the machine in operation. Immediately the spindle 27 and its head 25 are rotated directly by means of spur gear 53, and the rod-end holding head 39 is rotated at exactly the same speed indirectly by means of gears 81 and 46 on shaft 80. At the same time the split nut 114, 115 is rotated at the selected speed through the gearing connected with shaft 126 including a gear 53 or 55 meshing with gear 140, and through gear 162 or 161 meshing with either gear 98 or gear 103. The resulting effect of operation of these correlated means is that the wire 229 is caused to be wound in the welding plane upon the successive rods 31 in a helix, the coils of which are uniformly spaced apart a distance determined in advance by the selected combination of change speed mechanism for driving the split nut. The wire is held by the guiding and tensioning means so as to be bent over successive rods 31, and at the welding points it is held so as to be at exactly the same distance longitudinally of the machine from the adjacent edge of the last laid coil.

Immediately upon the start of the machine the current-controlling mechanism, operated by cam 357 and cam roller 337, will, through the electrical connections described, cause making and breaking of the primary electrical circuit, with resulting flow of current through the secondary circuit at suitable low voltage and high amperage, and timed to be completed during the selected periods when the wire 229 at a crossing point with rod 31 is passing through the welding plane beneath welding disc 234. And during this time and for a definite period thereafter, in the form of the invention shown in Figs. 10, 11 and 12, the contacting surfaces of the contact ring 233 on welding disc 234, and of the wire 229 are held stationary relative to each other by operation of cam 380 on cam roller 379 driven from the same shaft 381 which drives the cam 357. And also, during this same period, and in fact at all times, water is being delivered along the rods 31 and across the wire 229 in the welding plane from nozzles 390 and 391.

The effect of the correlated operation of these instrumentalities and operations is that the contacting portions of wire 229 and a rod 31 are by the concentration of flow of current immediately softened so that these portions fuse together. The wire and rod are forced to sink into one another by the pressure of the welding disc until portions of said disc contact with previously-laid coils of the wire and with the rod 31. This dissipates to a desired extent the concentration of current, and at the same time fixes the top plane of the wire at the welding point in the plane of previously-wound coils.

After current is terminated, the contacting parts of welding disc and wire continue to move together in stationary relation until the heat of welding has been sufficiently dissipated so that the parts are rigid and deformation cannot take place by reason of movement of the contact surface on the weld.

These operations continue automatically at a uniform rate as the shaft 48 and parts carried thereby are moved along the bed of the frame, with the result that successive helical coils are laid upon and by welding are metallically-integrated with the rods at all crossing points, until a cylindrical well screen of the desired length has been fabricated. The support 170 for the lead screw 93 remains at the center point of said lead screw between its two main supports on the machine. The support 203 for the shaft 80 remains in position until the carriage 84 causes the contact piece 212 to push said support or disappearing bearing 203 out of the way.

When the desired length or section of well screen has been fabricated by the above-defined steps and means, the rod-ends 408 are released from the end-holding head 39 and at the other end will have been withdrawn past the apertures in head 25 and anvil pieces 34. The sleeve nut 119 will be unscrewed and set upon holding device 187, the split nut separated, and by means of crank-arm 184 the tail-carriage will be drawn away from the rod-ends. The well screen section is then withdrawn from the machine, after which it has the finishing heads 409 and 410 applied to the projected rod-ends 407 and 408, and these heads are metallically integrated therewith. The fabricated well screen is then complete and ready for the market.

I claim:

1. A machine for making well screens, comprising a pair of disconnected heads adapted conjointly to hold a plurality of rods in position to outline a cylinder, one of said heads being rotatably secured to a longitudinal shaft, means for rotating said heads in unison at the same speeds, a screw thread on said shaft, a split nut adapted to engage said screw thread, means for rotating said split nut when so engaged to advance the shaft and the parts carried thereby longitudinally at a constant speed, means for holding a wire to be wound upon said cylinder of rods as the heads are rotated and separated to lay said wire in a helix upon said cylinder of rods, means for selectively changing the rate of advancement of the shaft and the second head carried thereby correspondingly to change the distance apart of the several coils of the helix, a welding disc engaging said wire which forms an electrode, means for periodically passing electric current of low voltage and high amperage through said electrode and from there through the wire and rods successively at each crossing point thereof, a circuit breaker for controlling the flow of said current, means for adjusting the rate of operation of said circuit breaker to adapt it to operate on said rod-outlined cylinders of different diameters, and means to move the electrode so that the contacting portions of the electrode and the wire will be held relatively stationary during the time of flow of current.

2. In a machine for making well screens, by welding together longitudinally-extended rods and a wire helically wound thereon at every crossing point of wire and rods, an electrode comprising a welding disc and a contact ring carried thereby for engaging the top surface and a side edge of said wire to hold the wire in position to receive electric current from the electrode, said disc having other portions positioned to engage a rod and a previously laid and welded top portion of the wire, respectively, after the wire and rod at the welding point have been softened by the action of said current and have been merged together a predetermined distance by pressure exerted by said welding disc.

3. In a machine for making well screen, by welding together longitudinally-extended rods and a wire helically wound thereon at every crossing point of wire and rods, an electrode comprising a welding disc, a contact ring carried thereby for engaging the top surface and a side edge of said wire to hold the wire in position to receive current from the electrode, and means for supporting said welding disc adapting it for vertical and transverse axial adjustment.

4. In a machine for making well screens, by welding together longitudinally-extended rods and a wire helically wound thereon at all their crossing points, an electrode comprising a contact ring formed with an annular top wall for engaging a top portion and an annular side wall for engaging a side portion of said wire to hold the wire in position on the rods to receive current from the electrode, and tensioning and guiding means for feeding the wire thereto slightly offset laterally from the plane of said vertical wall whereby the wire travels at a slight angle thereto and its said side portion is thereby caused to firmly engage the wall.

5. A machine for making well screens compromising a pair of disconnected heads adapted conjointly to hold a plurality of rods in position to outline a cylinder, means for continuously rotating said heads in unison at the same speeds, means including a lead screw, and a rotatable split nut adapted to be locked in engagement therewith for moving one head away from the other while both are rotated, and means including change speed gearing for rotating the split nut.

6. A machine for making well screens comprising an elongated bed, a fixed head at each end thereof, rotatable means on the forward head to hold a plurality of rods in position to outline a cylinder, a slide on the bed between the heads embodying rotatable means adapted to hold the ends of said rods in said cylinder, a pair of shafts extending along said bed between the heads, means to rotate the first-named holding means, means operated by one of said shafts to rotate the second-named holding means at the same speed as the first, and means operated by the second shaft to move the slide along the bed.

7. A machine for making well screens comprising an elongated bed, a fixed head at each end thereof, rotatable means on the forward head to hold a plurality of rods in position to outline a cylinder, a slide on the bed between the heads embodying rotatable means adapted to hold the ends of said rods in said cylinder, a pair of shafts extending along said bed between the heads, means to rotate the first-named holding means, means operated by one of said shafts to rotate the second-named holding means at the same speed as the first, a lead screw attached to the slide, and a rotatable nut on said rear head engageable with said lead screw and operated by the second shaft to move the slide along the bed.

8. A machine for making well screens comprising an elongated bed, a fixed head at each end thereof, rotatable means on the forward head to hold a plurality of rods in position to outline a cylinder, a slide on the bed between the heads embodying rotatable means adapted to hold the ends of said rods in said cylinder, a pair of shafts extending along said bed between the heads, means to rotate the first-named holding means, means operated by one of said shafts to rotate the second-named holding means at the same speed as the first, a lead screw attached to the slide, a gear on said rear head surrounding said lead screw and rotated by said second shaft, pivoted arms attached to said gear each carrying half of a split nut, and means to lock the split nut halves with the composite thread thereof in engagement with the lead screw thread whereby rotation of the gear will operate to move the slide along the bed.

9. A machine for making well screens comprising a pair of disconnected heads adapted to hold a plurality of rods in position to outline a cylinder, means for continuously rotating said heads in unison at the same speeds, a lead screw attached to one of said heads, a gear surrounding said lead screw, pivoted arms attached to said gear each carrying half of a split nut, means to lock the split nut halves with the composite thread thereof in engagement with the thread of the lead screw, and means for rotating the gear and split nut carried thereby to move said lead screw longitudinally and thereby move said last-named head away from the other while both are being rotated.

10. A machine for making well screens comprising a pair of disconnected heads adapted to hold a plurality of rods in position to outline a cylinder, means for continuously rotating said heads in unison at the same speeds, a lead screw attached to one of said heads, a gear surrounding said lead screw, pivoted arms attached to said gear each carrying half of a split nut, means to lock the split nut halves with the composite thread thereof in engagement with the thread of the lead screw, means for rotating the gear and split nut carried thereby to move said last-named head away from the other while both are being rotated, and means to rotate said gear and split nut at different speeds to vary the rate of travel away from said last-named head.

11. A machine for making well screens comprising a rotatable hollow spindle having a head plate provided with a series of circularly-disposed holes, and pieces formed with extensions having guide holes and open-topped guide grooves secured to said head plate so that the guiding means thereon are in alinement with the holes in the head plates whereby a group of rods extending from out the machine through said hollow spindle and severally through said sets of holes will be held to outline a circle in a plane passing through and at right angles to said rod guiding extensions.

12. A machine for making well screens comprising a rotatable hollow spindle having a head plate provided with a series of circularly-disposed holes, pieces formed with extensions having guide holes and open-topped guide grooves secured to said head plate so that the guiding means thereon are in alinement with the holes in the head plates whereby a group of rods extending from out the machine through said hollow spindle and severally through said sets of holes will be held to outline a circle in a plane passing through and at right angles to said rod guiding extensions, means to rotate the spindle and the rods carried thereby, means to feed a wire across said rods in said plane, and means to advance the rods over the guiding and holding means as the wire is fed.

13. A machine for making well screens comprising a rotatable hollow spindle having a head plate provided with a series of circularly-disposed holes, pieces formed with extensions having guide holes and open-topped guide grooves secured to said head plate so that the guiding means thereon are in alinement with the holes in the head plates whereby a group of rods extending from out the machine through said hollow spindle and severally through said sets of holes will be held to outline a circle in a plane passing through and at right angles to said rod guiding extensions, means to rotate the spindle and rods carried thereby, means to feed a wire across said rods in said plane as the rods are rotated, and an electrode engageable with said wire in said plane for cooperation with said pieces as second electrodes to effect welding of the wire to the rods.

14. A machine for making well screens comprising a rotatable hollow spindle having a head plate provided with a series of circularly-disposed holes, pieces formed with extensions having guide holes and open-topped guide grooves secured to said head plate so that the guiding means thereon are in alinement with the holes in the head plates whereby a group of rods extending from out the machine through said hollow spindle and severally through said sets of holes will be held to outline a circle in a plane passing through and at right angles to said rod guiding extensions, means to rotate the spindle and rods carried thereby, means to feed a wire across said rods in said plane as the rods are rotated, an electrode engageable with said wire in said plane for cooperation with said pieces as second electrodes to effect welding of the wire to the rods, and means to advance the rods along said guiding means and across said plane.

15. A machine for making well screens comprising means for holding a multiplicity of longitudinally-extended rods so as to outline a circle in a transverse plane, means for simultaneously rotating and advancing said rods, means for feeding irregularly shaped wire across said rods in said plane, and means engaging all faces and portions of said wire to hold and tension the wire.

16. A machine for making well screens comprising means for holding a multiplicity of longitudinally-extended rods so as to outline a circle in a transverse plane, means for simultaneously rotating and advancing said rods, means for feeding irregularly shaped wire across said rods in said plane, a guide table, and a multiplicity of rollers on said table having guide grooves adapted to engage and contact with the faces and portions of the wire on opposite sides thereof to tension and hold the wire.

17. A machine for making well screens comprising means for holding a multiplicity of longitudinally-extended rods so as to outline a circle in a transverse plane, means for simultaneously rotating and advancing said rods, means for feeding irregularly shaped wire across said rods in said plane, a guide table, a multiplicity of rollers on said table having guide grooves adapted to engage and contact with the faces and portions of the wire on opposite sides thereof to tension and hold the wire, and means to adjust the rollers toward or away from each other to regulate the tension applied to the wire.

18. A machine for making well screens comprising means for holding a multiplicity of longitudinally-extended rods so as to outline a circle in a transverse plane, means for simultaneously rotating and advancing said rods, means for feeding irregularly shaped wire across said rods in said plane, a guide table, a multiplicity of rollers on said table having guide grooves adapted to engage and contact with the faces and portions of the wire on opposite sides thereof to tension and hold the wire, said rollers being mounted on eccentric pins, and means to rotate and lock said eccentric pins to regulate the tension applied to said wire.

19. A machine for making well screens comprising means for holding a multiplicity of longitudinally-extended rods so as to outline a circle in a transverse plane, means for adapting said holding means to outline such circle of rods of different diameters, means for simultaneously rotating and advancing said rods as held, means including a table to guide and deliver a wire across said rods in said plane, and means to move the guide table to cause it to guide said wire in substantially tangential relation to any of said several circles.

20. A machine for making well screens comprising means for holding a multiplicity of longitudinally-extended rods so as to outline a circle in a transverse plane, means for adapting said holding means to outline such circle of rods of different diameters, means for simultaneously rotating and advancing said rods as held, a post mounted for up and down, lateral and axial movements, and a feed table mounted to oscillate on said post in said plane to guide and deliver a wire across said rods in said plane in substantially tangential relation to any of said several circles.

21. A machine for making well screens comprising means for holding a multiplicity of longitudinally-extended rods so as to outline a circle in a transverse plane, means for simultaneously rotating and advancing said rods as held, a disc electrode engaging said wire, means holding said disc for swinging movements above the wire, means for passing electric current through the electrode at crossing points of wire and rods, and means for swinging the electrode bodily to hold the contacting surfaces of wire and electrode relatively stationary while current is being passed.

22. A machine for making well screens comprising means for holding a multiplicity of longitudinally-extended rods so as to outline a circle in a transverse plane, means for simultaneously rotating and advancing said rods as held, a disc electrode engaging said wire, means holding said disc for swinging movements above the wire, a cam shaft, cams thereon, a circuit breaker operated by one of said cams to effect passing of electric current through the electrode at the crossing points of wire and rods, and means operated by the other cam in timed relation to said circuit breaker operation to swing the electrode bodily to hold the contacting surfaces of wire and electrode relatively stationary while the first-named cam is operating the circuit breaker to cause it to pass electric current.

23. A machine for making well screens comprising means for holding a multiplicity of longitudinally-extended rods so as to outline a circle in a transverse plane, means for simultaneously rotating and advancing said rods as held, a disc electrode engaging said wire, means holding said disc for swinging movements above the wire, means controlled by a cam for passing electric current through the electrode at crossing points of wire and rods for predetermined periods of time, said cam comprising two contacting cam plates with cooperative cam portions, and means to move the cam plates relatively to set them for providing a desired length of conjoint operative cam surface to effect a desired period of passing electric current.

24. A machine for making well screens comprising means for holding a multiplicity of longitudinally-extended rods so as to outline a circle in a transverse plane, means for simultaneously rotating and advancing said rods, means for feeding a wire across said rods in said plane, a disc electrode in said plane adapted to roll on said wire, and mounted for yielding up-and-down movements, and means in addition to the force of gravity to press the electrode upon the wire.

25. A machine for making well screens comprising a head plate embodying a cylindrical surface, means for rotating the head, a multiplicity of anvil guides on said head plate adapted to hold a corresponding number of longitudinally-extended rods so as to outline a circle in a transverse plane, shoes yieldingly held in contact with said cylindrical surface, electrical conductors formed of a multiplicity of copper strips connected with said shoes whereby said anvil plates are adapted to become individual electrodes in an electric circuit, means for laying a wire across said rods in said plane, a contact member engageable with said wire, an electrical conductor comprising a multiplicity of copper strips for completing said electric circuit, and means for passing a large volume of current at low voltage through said circuit when said contact member successively comes over crossing points of wire and rods.

26. A machine for making well screens comprising a head plate embodying a cylindrical surface, means for rotating the head, a multiplicity of anvil guides on said head plate adapted to hold a corresponding number of longitudinally-extended rods so as to outline a circle in a transverse plane, shoes yieldingly held in contact with said cylindrical surface, electrical conductors formed of a multiplicity of copper strips connected with said shoes whereby said anvil plates are adapted to become individual electrodes in an electric circuit, means for laying a wire across said rods in said plane, a contact piece supported to yieldingly engage said wire and adapted to be differently positioned to operate over rods outlining circles of different diameters, an electrical conductor comprising a multiplicity of copper strips extending thereto in a U-arch to permit such adjustment, and means for passing a large volume of current at low voltage through said circuit when said contact member successively comes over crossing points of wire and rods.

27. A machine for making well screens comprising means for holding a multiplicity of longitudinally-extended rods so as to outline a circle in a transverse plane, means for simultaneously rotating and advancing said rods, means for feeding a wire across said rods in said plane, an electrode in said plane adapted to continuously contact said wire, as it is being wound, and means for delivering electric current in large volume and of low voltage from said electrode through the wire and rods at each of the successive crossing points thereof.

28. A machine for making well screens comprising a rotatable head formed with a cylindrical surface, said head holding a multiplicity of longitudinally-extended rods so as to be in electrical communication with said surface and to outline a circle in a transverse plane, means to rotate the head and to simultaneously advance the rods while so held, means for delivering a wire across said rods in said plane while the rods are rotated and advanced, a contact piece held in continuous engagement with said wire, means including a transformer to deliver a large volume of current at low voltage, shoes continuously contacting with said cylindrical surface, and flexible conductors connecting the respective poles of said transformer to the contact piece and said shoes respectively for carrying said current to pass through the crossing points of wire and rods.

29. A machine for making well screens comprising a rotatable head formed with a cylindrical surface, said head holding a multiplicity of longitudinally-extended rods so as to be in electrical communication with said surface and to outline a circle in a transverse plane, means to rotate the head and to simultaneously advance the rods while so held, means for delivering a wire across said rods in said plane while the rods are rotated and advanced, a contact piece held in continuous engagement with said wire, means including a transformer to deliver a large volume of current at low voltage, shoes continuously contacting with said cylindrical surface, and flexible conductors connecting the respective poles of said transformer to the contact piece and said shoes respectively for carrying said current to pass through the crossing points of wire and rods, each of said electric conductors formed of a multiplicity of contiguous copper strips.

30. A machine for making well screens comprising an elongated bed, means on said bed including a slide having a rotatable head adapted to hold a plurality of rods in position to outline a cylinder, a lead screw and means cooperating therewith to move the slide on the bed, and means independent of the lead screw for manually moving said slide and lead screw.

31. A machine for making well screens comprising an elongated bed, means on said bed including a slide having a rotatable head adapted to hold a plurality of rods in position to outline a cylinder, a lead screw and means cooperating therewith to move the slide on the bed including a support for the lead screw at the end of the bed, a second slide, means carried by the second slide for supporting the lead screw, and connections between the two slides whereby said last-named support is maintained midway between the first-named support and the slide as the lead screw is moved.

32. A machine for making well screens comprising an elongated bed, means on said bed including a slide having a rotatable head adapted to hold a plurality of rods in position to outline a cylinder, a lead screw and means cooperating therewith to move the slide on the bed including a support for the lead screw at the end of the bed, a second slide, means carried by the second slide for supporting the lead screw, a pinion on the second slide, a rack on the bed in mesh with said pinion, and a second rack connected with the first slide and meshing with the opposite side of said pinion whereby said last-named support is maintained midway between the first-named support and the slide as the lead screw is moved.

33. A machine for making well screens comprising an elongated bed, means on said bed including a slide having a rotatable head adapted to hold a plurality of rods in position to outline a cylinder, a lead screw and means cooperating therewith to move the slide on the bed including a support for the lead screw at the end of the bed, a hand crank and a pinion rotatable thereby, and racks on the bed and connected with the slide for moving the slide and lead screw independently of the lead screw.

34. A machine for making well screens comprising an elongated bed, means on said bed including a slide having a rotatable head adapted to hold a plurality of rods in position to outline a cylinder, a lead screw and means cooperating therewith to move the slide on the bed including a support for the lead screw at the end of the bed, a second slide, a stand on said second slide, a spool on the stand rotatably engaging the under surface of the lead screw to support the same, and connections between the two slides whereby said last-named support is maintained midway between the first-named support and the slide as the lead screw is moved.

35. In a machine for making well screens comprising means for holding a multiplicity of longitudinally-extended rods so as to outline a circle in a transverse vertical plane, means for simultaneously rotating and advancing said rods, a disc electrode having an annular face lying in said plane, means for holding and feeding a wire transversely across said rods, said means being offset slightly from said annular face whereby the wire is fed at a slight angle thereto, and a portion of said wire is caused to continuously and certainly engage said face.

36. A machine for making well screens comprising a pair of separate heads adapted conjointly to hold a plurality of rods in position to outline a cylinder, means for rotating said heads in unison at the same speed, means for continually moving one head away from the other head while they are being rotated, means for feeding a wire to cause it to wind helically around said rods, a welding electrode having a contact ring formed with an annular top wall for engaging a top portion of the wire and formed with an annular side wall for engaging a side portion of said wire to hold the wire in position on the rods, and tensioning and guiding means for causing the wire to be fed slightly offset laterally from the plane of said side wall whereby the wire travels at a slight angle thereto and is thereby caused to firmly engage said wall.

37. A machine for making well screens comprising a pair of separate heads adapted conjointly to hold a plurality of rods in position to outline a cylinder, means for rotating said heads in unison at the same speed, a lead screw upon which one of said heads is rotatably mounted, a nut engaging the thread of said screw for moving said last mentioned head away from the other head while both heads are rotated, means for feeding a wire to cause it to wind helically around said rods, and means for welding the wire and rods together at the crossing points thereof.

EDWARD E. JOHNSON.